US010820336B2

(12) United States Patent
Khoryaev et al.

(10) Patent No.: US 10,820,336 B2
(45) Date of Patent: Oct. 27, 2020

(54) GEO-INFORMATION REPORTING FOR VEHICLE-TO-VEHICLE SIDELINK COMMUNICATIONS

(71) Applicant: Intel Corporation, Santa Clara, CA (US)

(72) Inventors: Alexey Khoryaev, Nizhny Novgorod (RU); Sergey Panteleev, Nizhny Novgorod (RU); Mikhail Shilov, Nizhny Novgorod (RU); Sergey Sosnin, Zavolzhie (RU)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 16/080,554

(22) PCT Filed: Aug. 1, 2016

(86) PCT No.: PCT/US2016/045016
§ 371 (c)(1),
(2) Date: Aug. 28, 2018

(87) PCT Pub. No.: WO2017/171908
PCT Pub. Date: Oct. 5, 2017

(65) Prior Publication Data
US 2019/0020987 A1 Jan. 17, 2019

Related U.S. Application Data

(60) Provisional application No. 62/317,290, filed on Apr. 1, 2016.

(51) Int. Cl.
*H04W 4/02* (2018.01)
*H04W 72/12* (2009.01)
(Continued)

(52) U.S. Cl.
CPC ....... *H04W 72/1205* (2013.01); *H04W 4/029* (2018.02); *H04W 4/46* (2018.02);
(Continued)

(58) Field of Classification Search
None
See application file for complete search history.

(56) References Cited

U.S. PATENT DOCUMENTS

| 2010/0203902 A1* | 8/2010 | Wachter | H04W 4/029 455/456.3 |
| 2012/0314588 A1* | 12/2012 | Nammi | H04L 1/0027 370/252 |

(Continued)

OTHER PUBLICATIONS

International Patent Office—International Search Report and Written Opinion dated Dec. 8, 2016 from International Application No. PCT/US2016/045016, 13 pages.
(Continued)

*Primary Examiner* — Brandon M Renner
(74) *Attorney, Agent, or Firm* — Schwabe, Williamson & Wyatt, P.C.

(57) ABSTRACT

Methods, systems, and storage media for reporting geo-information in wireless communications networks are described. In embodiments, an evolved nodeB (eNB) may configure a user equipment (UE) to report its geo-information, and use the reported geo-information for scheduling vehicle-to-vehicle (V2V) communications. The eNB may also allocate radio frequency (RF) resources for V2V communications based on reported geo-information. In embodiments, a UE may report its geo-information based on a configuration message received from an eNB, receive scheduling information for V2V communications, and determine or select RF resources on which to transmit or receive V2V communications. Other embodiments may be described and/or claimed.

8 Claims, 8 Drawing Sheets

(51) Int. Cl.

| | | |
|---|---|---|
| *H04W 4/80* | (2018.01) | |
| *H04W 76/14* | (2018.01) | |
| *H04W 72/04* | (2009.01) | |
| *H04W 4/46* | (2018.01) | |
| *H04W 4/029* | (2018.01) | |
| *H04W 76/27* | (2018.01) | |
| *H04W 8/00* | (2009.01) | |
| *H04W 24/00* | (2009.01) | |
| *H04W 92/20* | (2009.01) | |

(52) U.S. Cl.
CPC ........... *H04W 4/80* (2018.02); *H04W 72/042* (2013.01); *H04W 72/046* (2013.01); *H04W 76/14* (2018.02); *H04W 76/27* (2018.02); *H04W 8/005* (2013.01); *H04W 24/00* (2013.01); *H04W 92/20* (2013.01)

(56) References Cited

U.S. PATENT DOCUMENTS

| | | | | |
|---|---|---|---|---|
| 2014/0241260 | A1* | 8/2014 | Schmidt ............... | H04W 72/04 370/329 |
| 2014/0357297 | A1* | 12/2014 | Futaki ................. | H04L 43/0888 455/456.1 |
| 2015/0094089 | A1* | 4/2015 | Moeglein .............. | H04W 4/029 455/456.1 |
| 2015/0201303 | A1* | 7/2015 | Ji ......................... | H04W 4/029 455/456.1 |
| 2016/0044486 | A1* | 2/2016 | Pais ...................... | H04W 8/005 370/252 |
| 2016/0100288 | A1* | 4/2016 | Chaponniere ......... | H04W 4/023 455/456.1 |
| 2016/0295624 | A1* | 10/2016 | Novlan ................. | H04W 76/14 |
| 2016/0345346 | A1* | 11/2016 | Kim ....................... | H04L 5/001 |
| 2016/0353450 | A1* | 12/2016 | Miao .................... | H04W 72/0406 |
| 2017/0118592 | A1* | 4/2017 | Patel ..................... | H04W 4/021 |
| 2017/0180091 | A1* | 6/2017 | Futaki .................. | H04W 76/15 |
| 2019/0075547 | A1* | 3/2019 | Chae ...................... | H04W 4/40 |

OTHER PUBLICATIONS

Ericsson, "Sidelink Resource Allocation in V2X," 3GPP TSG-RAN WG2 #93, TDOC R2-161566, Agenda Item: 7.11, Feb. 15-19, 2016, Malta, 10 pages.

ZTE, "Enhancement of resource allocation and procedure for V2V," 3GPP TSG-RAN WG1 Meeting #83, R1-157777, Agenda Item: 6.2.8.1.1, Nov. 15-22, 2015, Anaheim, USA, 8 pages.

LG Electronics, "Presentation of Specification/Report to TSG: TR 36.885, Version 1.0.0," 3GPP TSG-RAN Meeting #71, Tdoc RP-160439, Agenda item: 10.53, Mar. 7-10, 2016, Göteborg, Sweden, 89 pages.

3GPP, "Technical Specification Group Services and System Aspects; Universal Geographical Area Description (GAD) (Release 13)," 3GPP TS 23.032 V13.0.0 (Dec. 2015), 29 pages.

3GPP, "Technical Specification Group Radio Access Network; Evolved Universal Terrestrial Radio Access (E-UTRA); LTE Positioning Protocol (LPP) (Release 13)," 3GPP TS 36.355 V13.1.0 (Mar. 2016), 141 pages.

* cited by examiner

GEO-INFORMATION REPORTING FOR VEHICLE-TO-VEHICLE SIDELINK COMMUNICATIONS

RELATED APPLICATIONS

The present application is a national phase entry under 35 U.S.C. § 371 of International Application No. PCT/US2016/045016, filed Aug. 1, 2016, entitled "GEO-INFORMATION REPORTING FOR VEHICLE-TO-VEHICLE SIDELINK COMMUNICATIONS", which designates the United States of America, which claims priority under 35 U.S.C. § 119 to U.S. Provisional Application No. 62/317,290 filed on Apr. 1, 2016, the entire disclosures of which are hereby incorporated by reference in their entireties.

FIELD

Implementations of the claimed invention generally relate to the field of wireless communications, and in particular, to allocation and selection of radio frequency resources for vehicle-to-vehicle sidelink transmissions.

BACKGROUND

Vehicle-to-vehicle (V2V) communications is an emerging field in wireless communications. V2V allows vehicles to communicate with each other to support various applications, such as safety applications and autonomous operation/driving applications. Geo-information, such as a user equipment (UE) position and/or coordinates, may be used to schedule direct device-to-device (D2D) communications or sidelink transmissions over an air-interface.

In typical wireless networks, geo-information may be reported to, or obtained by, an evolved nodeB (eNB) utilizing location positioning protocol (LPP) or LocationInfo reporting. However, these mechanisms are not suitable for scheduling V2V sidelink transmissions. First, LPP does not provide information to the Access Stratum (AS), which is a functional layer in Long Term Evolution (LTE) wireless telecom protocol stacks between a radio access network (RAN) and UEs. Because LPP does not provide information to the AS, it may be difficult or require significant communications overhead for an eNB to acquire geo-information for sidelink scheduling purposes. Second, the LocationInfo information element (IE) is used to transfer detailed location information available at the UE for correlation of measurements and UE position information. The LocationInfo IE is carried by a measurements report in a radio resource control (RRC) message to aid in cell selection, handover, failure handling, and testing. However, the measurement report may not be useful for V2V sidelink transmission scheduling and may increase signaling overhead if triggered for scheduling purposes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
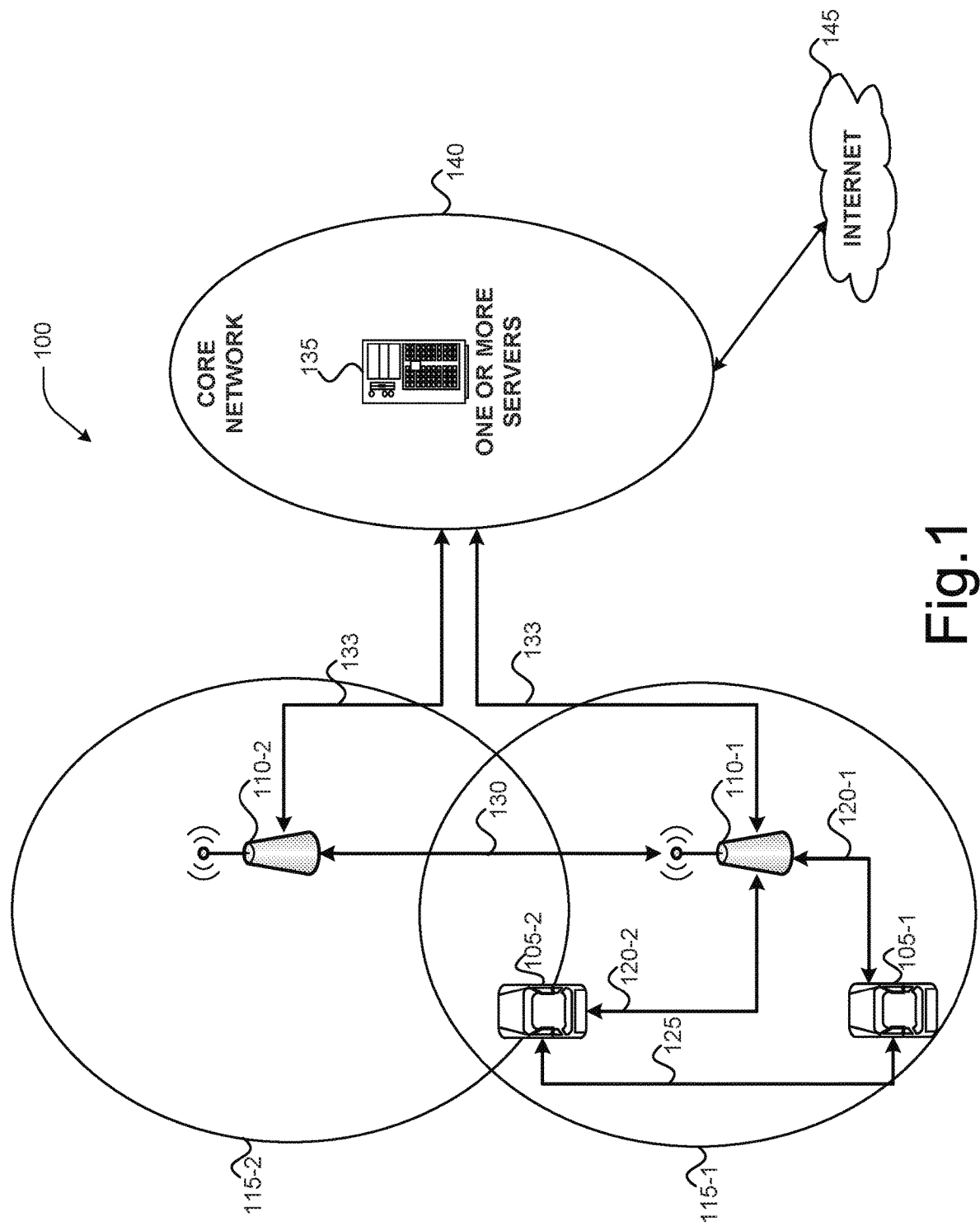
FIG. 1 illustrates a cellular communications network in accordance with various example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "processor circuitry" or "central processing circuitry" refers to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" refers to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and the like).

As used herein, the term "user equipment" may be considered synonymous to, and may hereafter be occasionally referred to, as a V2V device, a vehicle-to everything (V2X) device, client, mobile, mobile device, mobile terminal, user terminal, mobile unit, mobile station, mobile user, UE, subscriber, user, remote station, access agent, user agent, receiver, etc., and may describe a remote user of network resources in a communications network. Furthermore, the term "user equipment" may include any type of wireless/wired device such as consumer electronics devices, onboard diagnostic (OBD) devices, dashtop mobile equipment (DME), mobile data terminals (MDTs), in-vehicle infotainment (IVI) devices, an in-car entertainment (ICE) devices, wireless phones or smartphones, laptop personal computers (PCs), tablet PCs, wearable computer devices, machine type communication (MTC) devices, and/or any other physical device capable of recording, storing, and/or transferring digital data to/from other computer devices.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computer device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), base transceiver station (BTS), access point (AP), roadside unit (RSU), any new radio-interface technologies developed by 3GPP and/or other like organizations, etc., and may describe equipment that provides the radio baseband functions for data and/or voice connectivity between a network and one or more users. Furthermore, the term "RSU" may refer to any transportation infrastructure entity implemented in an eNB or a stationary (or relatively stationary) UE. An RSU implemented in a UE may be referred to as a "UE-type RSU" and an RSU implemented in an eNB may be referred to as an "eNB-type RSU."

It should also be noted that the term "channel" as used herein may refer to any transmission medium, either tangible or intangible, which is used to communicate data or a data stream. Additionally, the term "channel" may be synonymous with and/or equivalent to "communications channel," "data communications channel," "transmission channel," "data transmission channel," "access channel," "data access channel," "link," "data link," "sidelink," "carrier," "radiofrequency carrier," and/or any other like term denoting a pathway or medium through which data is communicated. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

Embodiments herein relate to mechanisms for reporting and utilizing geo-information for scheduling V2V sidelink transmissions. Geo-information, such as vehicle coordinates, can be used to schedule direct D2D communication or V2V transmissions over an air-interface. An evolved Node B (eNB) may utilize geo-information to avoid collisions and ensure that certain spatial isolation range between vehicles is preserved so that co-channel interference in target V2V communication range is under control. In addition, an eNB may assign orthogonal frequency resources to transmitting devices so that near-far and in-band emission problems, from the receiving device perspective, are reduced. Beside scheduling considerations, an eNB may also utilize geo-information for improving handover performance and proper packet routing within a wireless network. The mechanisms to configure, report and coordinate geo-information usage for eNB and user equipment (UE) are discussed herein. Other embodiments may be described and/or claimed.

FIG. 1 illustrates an example of a cellular communications network 100 (also referred to as "network 100" and the like), according to an example embodiment. Network 100 includes two UEs 105 (UE 105-1 and UE 105-2 are collectively referred to as "UE 105" or "UEs 105"), two eNBs 110 (eNB 110-1 and eNB 110-2 are collectively referred to as "eNB 110" or "eNBs 110"), two cells 115 (cell 115-1 and cell 115-2 are collectively referred to as "cell 115" or "cells 115"), and one or more servers 135 in a core network (CN) 140 that is connected to the internet 145. The following description is provided for an example network 100 that operates in conjunction with the LTE standard as provided by 3rd Generation Partnership Project (3GPP) technical specifications (TS). Furthermore, for illustrative purposes, the network 100 is shown and/or described as being deployed in a freeway/highway/roadway environment. However, the example embodiments are not limited in this regard and the described embodiments may apply to other networks and/or deployment scenarios that may benefit from the principles described herein.

Referring to FIG. 1, UEs 105 may be physical hardware devices capable of running one or more applications, capable of accessing network services via one or more radio links 120 (radio link 120-1 and radio link 120-2 are collectively referred to as "radio links 120" or "links 120") with a corresponding eNB 110, and capable of communicating with one another via sidelink 125. A link 120 may allow the UEs 105 to transmit and receive data from an eNB 110 that provides the link 120, and sidelink 125 may allow the UEs 105 to transmit and receive data from another UE 105. The sidelink 125 between the UEs 105 may include one or more channels for transmitting information from UE 105-1 to UE 105-2 and vice versa. The channels may include the Physical Sidelink Broadcast Channel (PSBCH), Physical Sidelink Control Channel (PSCCH), Physical Sidelink Discovery Channel (PSDCH), Physical Sidelink Shared Channel (PSSCH), and/or any other like communications channels or links used to transmit/receive data. The air interface between two or more UEs 105 may be referred to as a PC5 interface.

To transmit/receive data to/from one or more eNBs 110 or UEs 105, the UEs 105 may include a transmitter/receiver (or alternatively, a transceiver), memory, one or more processors, and/or other like components that enable the UEs 105 to operate in accordance with one or more wireless communications protocols and/or one or more cellular communications protocols. The UEs 105 may have multiple antenna elements that enable the UEs 105 to maintain multiple links 120 and/or sidelinks 125 to transmit/receive data to/from multiple eNBs 110 and/or multiple UEs 105. For example, as shown in FIG. 1, UE 105 may connect with eNB 110-1 via link 120-1 and simultaneously connect with UE 105-2 via sidelink 125.

UEs 105 may be capable of collecting and/or determining geo-information, such as a geolocation or Global Navigation Satellite System (GNSS) or Global Positioning System (GPS) coordinates, and provide a report including the geo-information (also referred to as a "geo-information report" or "geo-information update") to an eNB 110. The UEs 105 may collect and report geo-information based on instructions received from an eNB 110. Further, the instructions may also indicate a trigger for transmitting the report. In this regard, the UEs 105 may be capable of detecting a trigger event, and transmitting the report based on the occurrence of the trigger event. The aforementioned instructions may be referred to as "geo-information reporting configuration" and the like. The UEs 105 may also be capable of measuring various cell-related criteria, such as channel conditions and signal quality (for example, reception-transmission time difference measurements, Received Signal Strength Indicator (RSSI) measurements, channel occupancy measurements, RSRP/RSRQ measurements, Signal-to-Noise Ratio (SNR) measurements, Signal-to-Interference-plus-Noise Ratio (SINR) measurements, and the like), and provide a measurement report including this information to an eNB 110. To these ends, UEs 105 may be capable of receiving radio frequency signals from the eNBs 110, decoding these signals to obtain messages from the eNBs 110, generating and encoding messages (for example, geo-information reports), and signaling such messages to the eNBs 110.

In embodiments, a geo-information report may comprise one or more of geo-information, a timestamp, a speed or velocity of the UE 105, and/or other like information. In various embodiments, the geo-information may be a coordinate of the UE 105. The coordinate may be an absolute coordinate or a relative coordinate. The absolute coordinate may be in a World Geodetic System 84 (WGS-84) format or other standard of absolute coordinate representation, such as a GNSS, GPS, or other like coordinate defined by LPP. In some embodiments, coordinate uncertainty information may be included with the coordinate, if available. The relative coordinate may be a coordinate of the UE 105 that is relative to another object, such as a reference geographical point that may be collocated with the serving eNB 110 or any other geographical point. The relative reporting format may benefit from the reduced payload size while it can still provide accurate geo-information. In some embodiments, the reference point for relative coordinate calculation may be signaled to the UE 105 via dedicated radio resource control (RRC) signaling or included with some other RRC message. In embodiments, the reference point may be defined for a relatively small area in order to keep the same accuracy across the network 100. Using a relatively small area as a reference point may be useful for deployment scenarios where geo-information reports are required to have a limited payload size, such as when the geo-information report is to be signaled using a "small data payload" as is defined for MTC signaling in current LTE standards. In other embodiments, the geo-information may comprise a geographical sub-area identifier (GSAID) in which the UE 105 is located. In such embodiments, an association or mapping of GSAIDs with geographical sub-areas (GSAs) may be known to the UE 105 in advance, or such an association/mapping may be signaled to the UE 105 jointly with a geo-information reporting configuration message. The association/mapping may also include radio frequency (RF) resources associated with each GSA and/or GSAID. Furthermore, in embodiments, the speed or velocity of the UE 105 may be reported if the UE 105 is unable to obtain reliable geo-location information. In such embodiments, the eNB 110 may use the reported speed to refine previously acquired geo-information associated with the UE 105 or geo-information obtained using LPP.

The timestamp in the geo-information report may indicate a time associated with geo-information acquisition. The timestamp may be used to track a movement direction and speed of the UE 105. In various embodiments, the timestamp may be a time at which the geo-information was acquired, collected, or obtained. This may be referred to as an "explicit timestamp." In some embodiments, instead of an explicit timestamp, a time instance can be taken at the time of generating or transmitting the report (also referred to as an "implicit timestamp"), which may reduce system overhead. An implicit timestamp may be possible due to synchronous operations in LTE networks. In other embodiments, the eNB 110 may instruct the UE 105 to collect geo-information periodically or at some predefined interval. In such embodiments, the UE 105 may report the latest available geo-information at each period or reporting time instance, and use the reporting time instance as the timestamp. In some embodiments, the period or predefined interval may be indicated as a subframe window size in which the timestamp is to be recorded, or indicated as an amount of time after acquisition of the geo-information in which the timestamp is to be recorded.

In some embodiments, the UE 105 may report "coarse" or quantized geo-information (for example, geo-information with granularity of approximately 50 meters) in situations where precise knowledge of geo-information may not be available to a UE 105. Reporting of coarse or quantized geo-information may be used in embodiments where the UE 105 is aware of GSA coordinates or GSAIDs (for example, when the UE 105 is configured to report relative coordinates). In this way, an eNB 110 may use the coarse geo-information to detect the presence of a UE 105 within a GSA, which in some cases may be sufficient for scheduling purposes. In other embodiments, "fine" geo-information (for example, geo-information with granularity of approximately 1 to 2 meters) may be desirable for V2V services so that an eNB 110 may better assign or schedule orthogonal resources. However, reporting fine geo-information may cause increased signaling overhead when compared to reporting coarse geo-information.

In some embodiments, the UE 105 may include additional information about observed or measured environmental conditions in the report, such as Received Signal Strength Indicator ("RSSI") measurements of sidelinks 125, a number of other devices detected by a UE 105, and other like information. This information may be used by an eNB 110 to adjust service parameters for PC5 transmissions.

The trigger for sending the geo-information report may be periodic or based on a predefined event. A periodic trigger may indicate that the UE 105 should transmit the geo-information report at a predefined or specified interval (for example, in milliseconds). In some deployment scenarios, relatively long reporting periodicities may be sufficient given that a UE position may change very little even at high speeds. For example, at 250 kilometers per hour (km/h) a UE 105 position may change less than 70 meters per second (mps). An event-based trigger may indicate that a UE 105 should transmit the geo-information report upon the occurrence of a specified event, for example, when the UE 105 travels a specified distance, when the UE 105 changes a speed/velocity by a specified amount, or when the UE 105 changes a direction of travel since transmission of a previous report. In some embodiments, a periodic trigger may be combined with an event-based trigger, which may be referred to as an adaptive trigger or an adaptive periodicity. For example, an adaptive trigger may indicate that the UE 105 should transmit geo-information reports at a first predefined interval while the UE 105 is at or above a predefined velocity (for example, a speed threshold) and transmit geo-information reports at a second predefined interval while the UE 105 is below the predefined velocity. In this way, when the UE 105 travels at a velocity that is below the predefined velocity, the UE 105 may send reports less frequently, which may reduce signaling overhead. In such embodiments, the geo-information report may also indicate the adjusted reporting period or interval based on changing conditions (for example, the UE 105 transmitting geo-information reports at the second predefined interval when the velocity of the UE 105 drops below the speed threshold). Furthermore, in some embodiments, a maximum and/or minimum reporting periodicity may be set by higher layers, for example, using common or dedicated RRC signaling.

Several mechanisms may be used by the UEs 105 to signal a geo-information report to an eNB 110. In some embodiments, the reporting of geo-information may be similar to layer 1 (L1) reporting mechanisms that are used for channel state information (CSI), channel quality indicator (CQI), rank indicator ("RI"), pre-coding matrix indicator ("PMI"), and the like. In embodiments where L1 reporting is used, the geo-information report may be signaled to an eNB 110 via link 120 using a physical uplink control channel (PUCCH), a physical uplink shared channel (PUSCH), or a physical sidelink discovery channel (PSDCH). The PUCCH may be used where the geo-information report has a relatively small payload size, when the geo-information is used with low-latency applications, and/or for coarse geo-information reporting. The PUSCH may be used for geo-information reporting when semi-persistent scheduling (SPS) is used for scheduling uplink (UL) transmissions. Example embodiments provide enhancements of SPS mechanisms to support geo-information reporting with variable periods that slowly change over time based on speed, travel distance, and/or other conditions. Additional signaling may be introduced to inform an eNB 110 about changes of periodicity and trigger conditions, or the eNB 110 may track distance and speed changes of a UE 105 to adjust SPS periodicity. In some embodiments, the PSDCH may be used to carry information about geo-information even though PSDCH interception by eNB is not specified by current standards. In such embodiments, the UE 105 transmissions can be power controlled towards eNB 110 using eNB-UE path loss compensation. In addition, a discovery resource may be assigned by an eNB 110 to the UE 105 operating in a Type-2B discovery mode (for example, when the UE 105 requests an allocation for transmission of discovery information rather than autonomously selecting a discovery resource). Considering the periodic allocation of PSDCH with SPS resource assignments and power controlled transmissions, the eNB 110 may receive PSDCH transmissions that include geo-information that is collected on a periodic basis. Adjustment to the transmission timing may be set by downlink (DL) reception timing and may be changed to UL transmission timing. In such embodiments, a discovery message, which typically has a payload size of 232 bits, may carry the geo-information of the UE 105.

In other embodiments, layer 2 (L2) or layer 3 (L3) reporting mechanisms may be used for geo-information reporting. For L2 reporting, a media access control (MAC) control element (CE) carried by the PUSCH may be used. For L3 reporting, common or dedicated RRC signaling carried by the PUSCH may be used. Since geo-information reports may have a fixed structure depending on the report type (for example, a relative coordinate (or GSAID) and implicit timestamp, or an absolute coordinate and explicit timestamp), a fixed sized message including the report may be generated to accommodate the report. Therefore, a selected geo-information granularity (for example, coarse vs. fine geo-information) and a selected timing granularity (for example, relative timestamps vs. absolute timestamps) may influence the signaling type used to convey the report.

In embodiments where MAC CEs are used for geo-information reporting, an uplink shared channel (UL-SCH) MAC sub-header format may be used to define a geo-information reporting CE (GIRCE). In embodiments, a new logical channel identifier (LCD) may be allocated from a reserved range of 01100-10101 for the GIRCE. For example, the value 10101 in the LCID may be used to indicate that the MAC CE includes a GIRCE. In some embodiments, one MAC CE with a first LCID value (for example, 10101) may be defined for relative geo-information reporting and another MAC CE with another LCID (for example, 10100) may be defined for absolute geo-information reporting. In this way, the LCID value may be indicative of an amount of bits that are carried by the geo-information report. MAC CE signaling may provide less signaling overhead and lower latency when compared to RRC signaling due to the smaller message size. However, MAC CE signaling may not accommodate as much information as RRC signaling.

In embodiments where RRC signaling is used for geo-information reporting, the geo-information report could be included in a LocationInfo IE that may accompany measurement reports for cell selection and mobility. The LocationInfo IE may be altered in order to accommodate relative coordinates. However, geo-information reporting may be needed on a more frequent basis than cell measurements for cell selection and mobility. Moreover, legacy triggers for measurement reporting may not take into account location changes as discussed previously. Therefore, in alternate embodiments, a separate (dedicated) geo-information RRC message may be used in order to provide payload flexibility and to reduce reporting overhead. Although using dedicated RRC signaling may require more bits and have larger latency than MAC CE signaling, dedicated RRC signaling may accommodate more information (for example, an absolute coordinate with uncertainty information, speed, movement direction, absolute timestamp in UTC format, and the like) that may not be conveyed using MAC CE signaling. In some embodiments, the geo-information may be separately reported in a new uplink dedicated control channel (UL-DCCH) message type or IE, for example, a "LocationInfoReport" IE containing legacy LocationInfo as a mandatory or optional field as well as one or more new fields to include the previously described information.

In some embodiments, both MAC CE signaling and RRC signaling may be used. In this way, geo-information reporting may include fast-fixed size and medium time-scale variable size updates. For example, in some embodiments, the MAC CE may be used to carry relative coordinate changes while the RRC message may be used to carry an absolute coordinate, movement direction, speed, explicit timestamp, and/or other like information. In an example, the trigger may indicate to use MAC CE signaling when the UE 105 is traveling at or above a velocity/speed threshold, and to use RRC signaling when the UE 105 is traveling below the velocity threshold. In another example, the trigger may indicate to use MAC CE signaling after the UE 105 travels a first distance, and to use RRC signaling after the UE 105 travels a second distance that is greater than the first distance.

Referring back to FIG. 1, the eNBs 110 may be hardware computer devices configured to provide wireless communication services to mobile devices (for example, UEs 105) within a coverage area or cell 115 associated with an eNB 110 (for example, cell 115-1 associated with eNB 110-1 and cell 115-2 associated with eNB 115-2). A cell 115 providing services to UE 105 may also be referred to as a "serving cell," "cell coverage area," and the like. Each eNB 110 may be part of a radio access network (RAN) or associated with a radio access technology (RAT). For example, the eNBs 110 may be associated with an evolved universal terrestrial radio access network (E-UTRAN) when employing LTE standards. As discussed previously, eNBs 110 may provide wireless communication services to UE 105 via links 120. The links 120 between the eNBs 110 and the UEs 105 may include one or more downlink (or forward) channels for transmitting information from eNB 110 to UE 105. Links 120 may also include one or more uplink (or reverse) channels for transmitting information from UE 105 to an eNB 110. The channels may include the physical downlink shared channel (PDSCH), physical downlink control channel (PDCCH), physical hybrid automatic repeat request (HARD) indicator channel (PHICH), physical control format indicator channel (PCFICH), physical broadcast channel (PBCH), PUSCH, PUCCH, physical random access channel (PRACH), and/or any other like communications channels or links used to transmit/receive data. The air interface between a UE 105 and an eNB 110 may be referred to as an LTE-Uu interface.

The eNBs 110 may include a transmitter/receiver (or alternatively, a transceiver) connected to one or more antennas, one or more memory devices, one or more processors, and/or other like components. The one or more transmitters/receivers may be configured to transmit/receive data signals to/from one or more UEs 105 within its cell 115 via one or more links that may be associated with a transmitter and a receiver. In embodiments where network 100 employs LTE or LTE-A standards, eNBs 110 may employ Evolved Universal Terrestrial Radio Access (E-UTRA) protocols, for example, using orthogonal frequency-division multiple access (OFDMA) for scheduling and transmitting downlink communications and single carrier frequency-division multiple access (SC-FDMA) for scheduling and receiving uplink communications from UEs 105. Furthermore, eNBs 110 may be capable of communicating with one another over a backhaul connection 130 and may communicate with the one or more servers 135 within a core network (CN) 140 over another backhaul connection 133. The backhaul connection 130 may include a wired connection employing an X2 application protocol (AP) interface, which defines an interface for communicating data packets directly between eNBs 110. The backhaul connection 133 may include a wired connection employing an S1-AP interface, which defines a protocol for the forwarding of packets to one or more mobility management entities (MMEs), one or more Serving Gateways (SGWs), and/or other like CN elements.

In various embodiments, the eNBs 110 may instruct UEs 105 to determine or obtain their geo-information and report the geo-information to the eNB 110. The eNBs 110 may also provide the UEs 105 with a trigger indicator (or trigger information) that informs the UEs 105 when to transmit such a report. This process may be referred to as configuring a UE 105 for geo-information reporting. In embodiments, the eNBs 110 may transmit a geo-information reporting configuration message to the UEs 105 in order to configure the UEs 105 for geo-information reporting. This message may include the one or more of a flag or indicator for activation of geo-information reporting; a minimum reporting periodicity (for example, in milliseconds); a maximum reporting periodicity (for example, in milliseconds); report trigger information; report timing information (also referred to as "timestamp reporting settings"); reporting type; and/or a reference point for relative coordinate reporting.

The report timing information may indicate when and how the UE 105 should record a timestamp with respect to acquisition of the geo-information. In embodiments, the report timing information may indicate a subframe window size in which the timestamp is to be recorded, a period of time after acquisition of the geo-information in which the timestamp is to be recorded, or to use a time at which the report is to be transmitted as the timestamp. The report type may indicate a coordinate system to be used for acquisition of the geo-information and a format to be used for the report. The coordinate system may be an absolute coordinate system or a relative coordinate system. In embodiments, the absolute coordinate system may include WGS-84 coordinates, a GNSS coordinates, GPS coordinates, or LPP coordinates. The WGS-84, GNSS, and GPS coordinates may be reported in a GPS message format, and the LTE-LPP coordinates may be reported in an LPP message format. In embodiments, the relative coordinate system may comprise coordinates of the UE that are relative to the reference point indicated in the configuration message. In some embodiments, relative coordinate system may comprise GSAIDs.

In various embodiments, the geo-information reporting configuration message may be an RRC message or any other higher layer message. For example, the geo-information reporting configuration message may be placed into a measurement configuration (MeasConfig) IE of an RRC reconfiguration message (RRCConnectionReconfiguration). In other embodiments, the geo-information reporting configuration message may be carried by system information or in a system information block (SIB) that is broadcast by an eNB 110.

Each eNB 110 may use reported geo-information to schedule V2V sidelink transmissions (also referred to as "V2V communications") over the PC5 air interface. In such embodiments, the eNBs 110 may schedule the V2V communications for the UEs 105 according to a semi-persistent scheduling (SPS) algorithm, and may provide scheduling information to the UEs 105. In some embodiments, the scheduling information may indicate radio frequency (RF) resources that the UEs 105 should use for V2V communications, while in other embodiments the UEs 105 may select one or more RF resources on which to transmit or receive V2V communications based on the scheduling information. For example, in embodiments, each eNB 110 may partition a surrounding geographic region into a plurality of GSAs, allocate RF resources (for example, frequency resources and/or time resources) to each GSA, and assign a GSAID to each GSA. A UE 105 may then determine a GSAID of a GSA in which it is located, and select RF resources of the identified GSA or GSAID according to the scheduling information. An example V2V scheduling scheme is shown and described with regard to FIG. 2.

Figure 2:
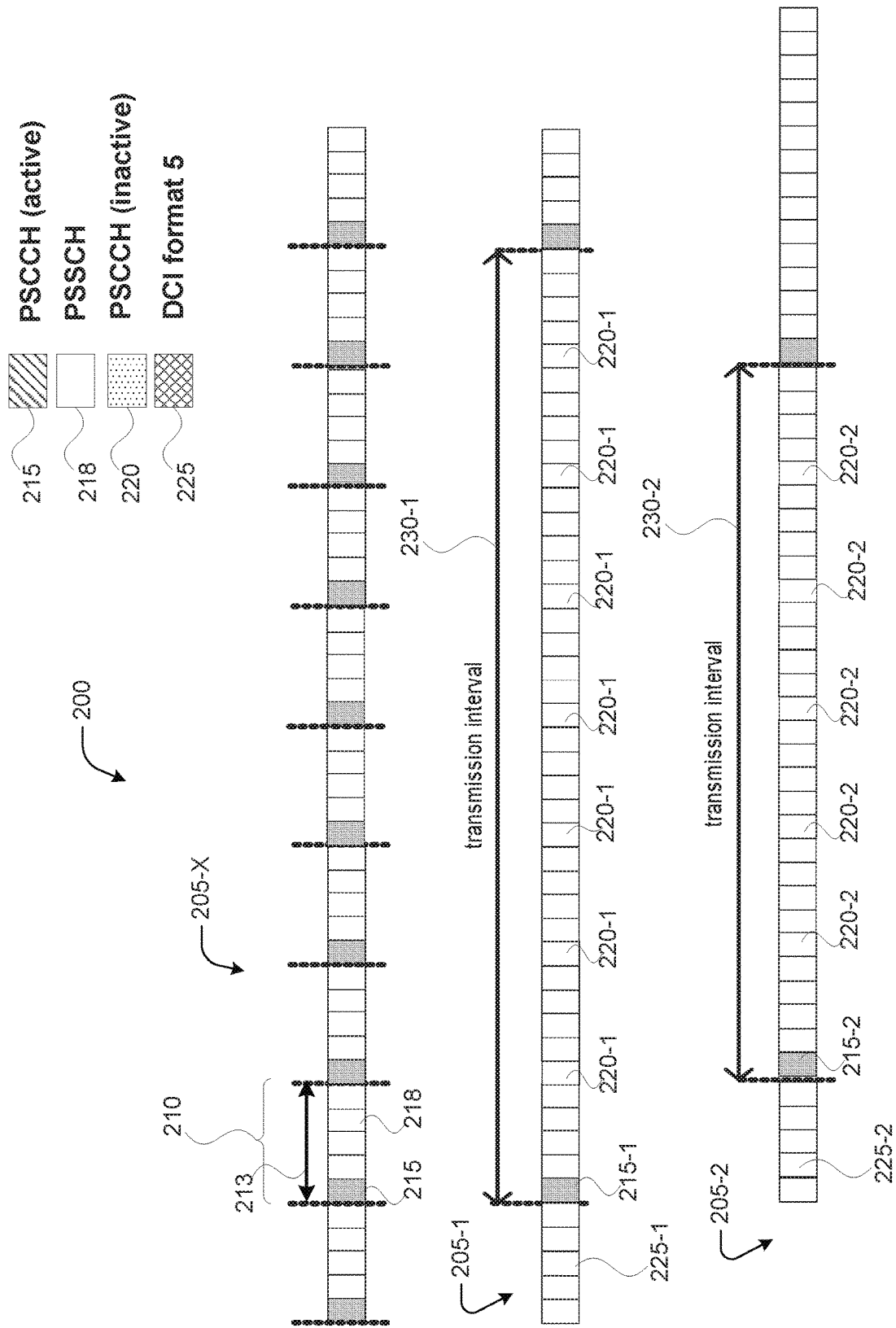
FIG. 2 illustrates an example resource allocation scheme, in accordance with various example embodiments.

FIG. 2 illustrates a V2V sidelink scheduling scheme 200 (also referred to as "scheme 200"), in accordance with various example embodiments. The scheme 200 may include a resource pool configuration (RPC) 205-X, a sidelink schedule 205-1, and a sidelink schedule 205-2. RPC 205-X may include a plurality of sidelink resource pools (SRPs) 210. As shown, each SRP 210 may have a length of one sidelink control (SC) period 213, and may comprise one active PSCCH subframe 215, and four PSSCH subframes 218. In other embodiments, the SRPs 210 may include more or fewer PSSCH subframes 218 than shown by FIG. 2.

In embodiments, eNB 110-1 may determine the sidelink schedule 205-1 for UE 105-1 and the sidelink schedule 205-2 for UE 105-2 according to an SPS algorithm and based on geo-information of the UEs 105 (sidelink schedule 205-1 and sidelink schedule 205-2 may be collectively referred to as "sidelink schedules 205"). In such embodiments, the eNB 110-1 may determine the transmission intervals 230-1 and 230-2 (collectively referred to as "transmission intervals 230") in which each UE 105 should transmit or receive V2V sidelink communications. For example, as shown by FIG. 2, the sidelink schedule 205-1 may include a transmission interval 230-1 for UE 105-1 to transmit/receive V2V communications, and the sidelink schedule 205-2 may include a transmission interval 230-2 for UE 105-2 to transmit/receive V2V communications. Additionally, the transmission intervals 230 may begin with an active PSCCH subframe 215 and span a plurality of SRPs 210. As shown, a first SRP 210 of the plurality of SRPs 210 in the transmission intervals 230 may include the active PSCCH 215, while the remaining SRPs 210 in the transmission interval may include inactive PSCCH subframes 220.

In embodiments, the eNB 110 may transmit a Downlink Control Information (DCI) format 5 message 225 to provide each UE 105 with its transmission interval 230. Upon receipt of a corresponding DCI format 5 message 225, each UE 105 may determine its corresponding transmission interval 230 and determine/select RF resources in its corresponding transmission intervals 230 on which to transmit/receive V2V communications. Prior to sending the DCI format 5 message 225 to the UEs 105, the eNB 110-1 may send an SPS configuration to the UEs 105 using higher layer signaling. For example, the SPS configuration may be included in an RRC connection setup message. The SPS configuration may include an RF allocation or a resource block (RB) assignment, and a window to monitor for a DCI format 5 message 225. In embodiments, the window may be a number PDCCH subframes.

A DCI format 5 message 225 may be used for scheduling of PSCCH transmissions, and may also comprise several sidelink control information (SCI) format 0 fields used for the scheduling of PSSCH transmissions. The SCI format 0 fields may include a field for a frequency hoping flag, a PSSCH resource block assignment field, a field for a time resource pattern, a field for a modulation and coding scheme, a field for a timing advance indication, and a field for a group destination identifier. According to current standards, an eNB 110 is required to send (and a UE 105 is required to receive) a DCI format 5 in advance of each upcoming PSCCH period, and as such, each DCI format 5 message may carry different sidelink scheduling information. By contrast, in various embodiments, a UE 105 may not be required to receive a new DCI Format 5 for each PSCCH period. This is because the RF resources for the V2V sidelink transmissions may be associated with one or more GSAs, and will likely not change across multiple PSCCH periods.

In embodiments, a DCI format 5 message 225 may indicate the transmission intervals 230 by at least indicating one or more active PSCCH subframes 215 and/or one or more PSSCH subframes 218. In a first embodiment, the transmission interval 230 may be indicated as an active PSCCH subframe 215 periodicity. The active PSCCH subframe 215 periodicity may indicate a timing between active PSCCH subframes 215. In such embodiments, the UEs 105 may be preconfigured to begin their corresponding transmission interval 230 at a nearest SC period after receipt of a DCI format 5 message 225. For example, with reference to FIG. 2, receipt of the DCI format 5 message 225-1 by the UE 105-1 may implicitly indicate that the UE 105-1 should start the transmission interval 230-1 at the active PSCCH subframe 215-1, which is nearest in time to the transmission (or receipt) of the DCI format 5 message 225-1. Further, since the PSCCH subframe 215 periodicity may indicate the timing between active PSCCH subframes 215, it may also implicitly indicate the plurality of inactive PSCCH subframes 220-1 in the transmission interval 230-1.

In a second embodiment, the transmission interval 230 may be indicated as a bitmap pattern. In such embodiments, the bitmap pattern is to activate PSCCH occasions over consecutive PSCCH periods. In some embodiments, the bitmap pattern may include a value of "1" for each active PSCCH subframe 215 and a value of "0" for each inactive PSCCH subframes 220 within the transmission interval 230. In this way, each value of "1" in the bitmap may indicate the beginning of an individual transmission interval 230. For example, a bitmap pattern of [1, 0, 0, 0, 1, 0, 0, 0] may indicate that the first and fifth PSCCH subframes are active PSCCH subframes 215 while the remaining PSCCH subframes are inactive PSCCH subframes 220. In some embodiments, the bitmap pattern itself may be signaled to the UEs 105 in or with the DCI format 5 message 225. In other embodiments, the bitmap pattern may be indicated using a time resource pattern index in the time resource pattern field of the DCI format 5 message 225. In such embodiments, each UE 105 may determine a corresponding bitmap pattern from a mapping or table of time resource pattern indices to bitmap patterns (also referred to as "subframe indicator bitmaps"). The bitmap patterns may differ depending on network configurations/deployments or UE mode of operation. In some embodiments, a number of PSCCH bitmap pattern repetitions (for example, 1, 2, 4, 8, etc.) may accompany the bitmap pattern, while in other embodiments, the number of PSCCH bitmap pattern repetitions may be preconfigured or signaled separate from the bitmap pattern.

In a third embodiment, an indication of periodicity and/or duration of the transmission interval 230 may be signaled to the UEs 105. In such embodiments, the periodicity and/or duration may be indicated as a multiple of PSCCH periods. For example, with reference to FIG. 2, the UE 105-2 may receive a DCI format 5 message 225-2. The DCI format 5 message 225-2 may indicate that the transmission interval 230-2 is to last for a single PSCCH period, starting at active PSCCH subframe 215-2. In some embodiments, the UE 105-2 may implicitly know or determine that the next five SRPs have inactive PSCCH subframes 220-2, while in other embodiments the DCI format 5 message 225-2 may indicate that the next five SRPs have inactive PSCCH subframes 220-2. Alternatively (or in addition), the DCI format 5 message 225-2 may indicate that the transmission interval 230-2 is to last for N milliseconds (where N is a number), starting at active PSCCH subframe 215-2. In this case, the UE 105-2 may implicitly know or determine that the next five SRPs have inactive PSCCH subframes 220-2, while in alternate embodiments, the duration of the transmission interval may be preconfigured at the UEs 105.

In a fourth embodiment, the transmission interval 230 may be indicated as one or more UE-specific transmission intervals 230. In some embodiments, the UE-specific transmission intervals 230 may include a PSSCH scheduling interval or window size that is preconfigured or signaled to the UEs 105 using higher layer signaling. The PSSCH scheduling intervals/windows may be similar to the PSCCH periodicity mentioned previously. However, the PSSCH scheduling intervals/windows may cover or overlap with multiple PSCCH periods (for example, [10, 20, 40, 80] or [10, 20, 25, 50]). In some embodiments, a UE-specific transmission interval 230 may include a periodicity of PSSCH scheduling intervals or windows within an SPS allocation, which may include a number of PSSCH subframes per transmission interval 230 (for example, [80, 160, 320, 640] or [100, 200, 400, 800, 1000] ms). This may also be referred to as a "periodicity of scheduling windows." In some embodiments, the UE-specific transmission interval 230 may include a PSSCH SPS allocation interval/duration, for example, a time of the UE-specific transmission interval in milliseconds (for example, [640, 1280, 2560, 5120, inf] ms or [600, 1200, 2400, 4800, inf] ms). In such embodiments, the set of values can be preconfigured or signaled using RRC signaling. This may also be referred to as a "semi-persistent allocation window."

Referring back to FIG. 1, in various embodiments, the eNBs 110 may communicate the reported geo-information and/or the RF resource allocation to one another via the backhaul connection 130. For example, eNB 110-1 may provide its schedule, RF allocation, and/or load indicators to eNB 110-2, and the eNB 110-2 may use the obtained schedule, RF allocation, and/or load indicators to refine or alter its own RF allocation and/or schedule (see for example, operations 422-428 of process 400 shown and described with regard to FIG. 4). The sharing of schedules, RF allocations, and/or load indicators among the eNBs 110 may be used for inter-cell coordination, which may reduce collisions, reduce co-channel interference, and/or reduce near-far and in-band emission problems for V2V communications. In addition, the eNBs 110 may also share reported geo-information with one another, which may be utilized for handover purposes and/or for packet routing within network 100. In some embodiments, the eNBs 110 may provide, over the backhaul connection 133, the geo-information to one or more CN elements in CN 140 for various purposes. For example, the eNBs 110 may provide the geo-information to a mobility management entity (MME) for mobility management and network access control; a proximity services (ProSe) function for ProSe and/or V2V authorizations, permissions, and/or subscriber data; and/or a location server (for example, an Enhanced Serving Mobile Location Centre (E-SMLC) or a secure user plane location (SUPL) location platform (SLP)) for enhancement of location or position information.

CN 140 may include one or more hardware devices such as the one or more servers 135. These servers may provide various telecommunications services to the UEs 105. In embodiments where network 100 employs the LTE standards, the one or more servers 135 of the CN 140 may comprise components of the System Architecture Evolution (SAE) with an Evolved Packet Core (EPC) as described by 3GPP TSs. In such embodiments, the one or more servers 135 of the CN 140 may include components such as one or more MMES and/or one or more Serving General Packet Radio Service Support Nodes (SGSN) (each of which may be referred to as an "SGSN/MME"), one or more serving gateways (SGW), one or more packet data network (PDN) gateways (PGW), one or more home subscriber servers (HSS), one or more access network discovery and selection functions (ANDSF), one or more evolved packet data gateways (ePDGs), one or more MTC interworking functions (IWF), one or more ProSe functions, one or more SLPs, and/or other like components as are known. In embodiments, the CN 140 may include one or more dedicated core networks (DCNs), where each DCN includes one or more of the aforementioned CN elements that are dedicated to serve specific type(s) of subscriber or traffic. The various CN elements of the CN 140 may route phone calls from UE 105 to other mobile phones or landline phones, or provide the UE 105 with a connection to the internet 145 for communication with one or more other computer devices. Because the components of the SAE core network and their functionality are generally well-known, a further detailed description of the SAE core network is omitted. It should also be noted that the aforementioned functions may be provided by the same physical hardware device or by separate components and/or devices.

Although FIG. 1 shows two cell coverage areas (for example, cells 115), two base stations (for example, eNBs 110), and two mobile devices (for example, UEs 105), it should be noted that in various example embodiments, network 100 may include many more eNBs serving many more UEs than those shown in FIG. 1. However, it is not necessary that all of these generally conventional components be shown in order to understand the example embodiments as described herein.

Figure 3:
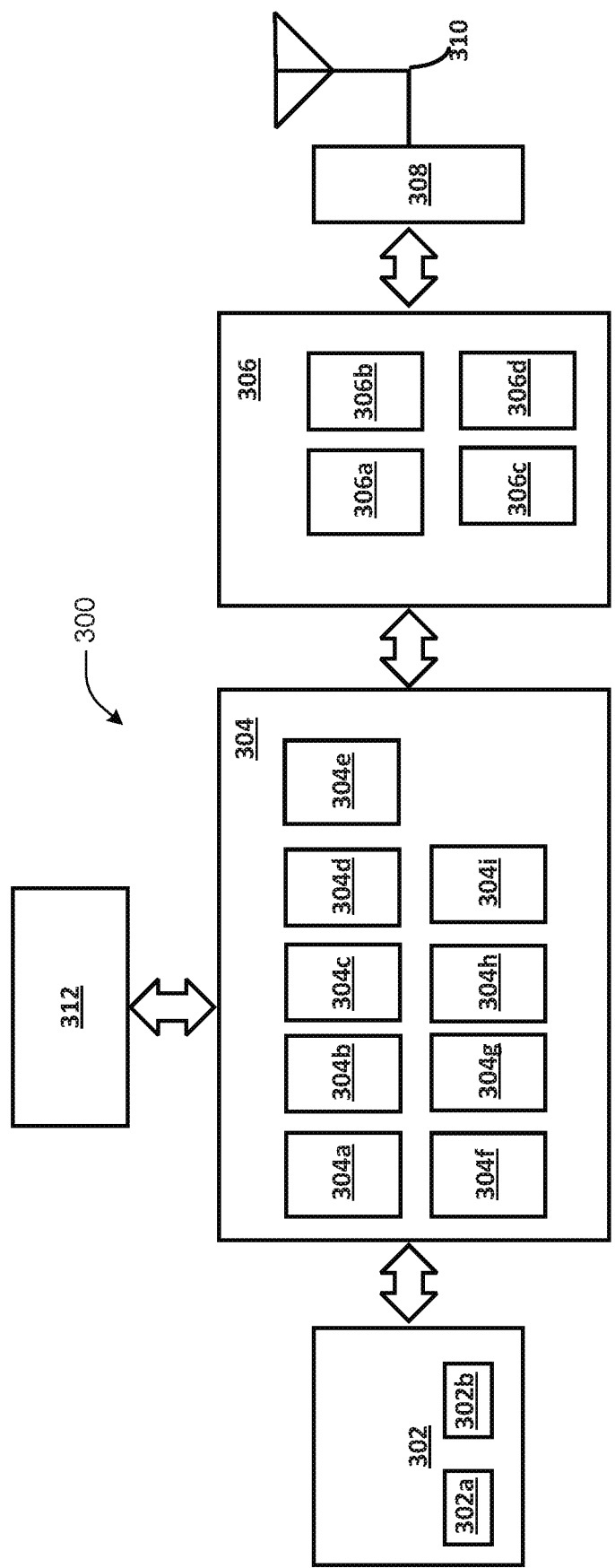
FIG. 3 illustrates example components of an electronic device for wireless communication, in accordance with various example embodiments.

FIG. 3 illustrates, for one embodiment, example components of an electronic device 300. In various embodiments, the electronic device 300 may be implemented in or by UE 105 and/or an eNB 110 as described previously with regard to FIG. 1. In some embodiments, the electronic device 300 may include application circuitry 302, baseband circuitry 304, radio frequency (RF) circuitry 306, front-end module (FEM) circuitry 308 and one or more antennas 310, coupled together at least as shown. In embodiments where the electronic device 300 is implemented in or by an eNB 110, the electronic device 300 may also include network interface circuitry (not shown) for communicating over a wired interface (for example, an X2 interface, an S1 interface, and the like).

The application circuitry 302 may include one or more application processors. For example, the application circuitry 302 may include circuitry such as, but not limited to, one or more single-core or multi-core processors 302a. The processor(s) 302a may include any combination of general-purpose processors and dedicated processors (e.g., graphics processors, application processors, etc.). The processors 302a may be coupled with and/or may include computer-readable media 302b (also referred to as "CRM 302b," "memory 302b," "storage 302b," or "memory/storage 302b") and may be configured to execute instructions stored in the CRM 302b to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuity 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding circuitry 304h and decoding circuitry 304i of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A CPU 304e (also referred to as "central processing circuitry") of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f The audio DSP(s) 304f may include elements for compression/decompression and echo cancellation and may include other suitable processing elements in other embodiments. The baseband circuitry 304 may further include computer-readable media 304g (also referred to as "CRM 304g," "memory 304g," "storage 304g," or "CRM 304g"). The CRM 304g may be used to load and store data and/or instructions for operations performed by the processors of the baseband circuitry 304. CRM 304g for one embodiment may include any combination of suitable volatile memory and/or non-volatile memory. The CRM 304g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 304g may be shared among the various processors or dedicated to particular processors. Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SoC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path that may include circuitry to down-convert RF signals received from the FEM circuitry 308 and provide baseband signals to the baseband circuitry 304. RF circuitry 306 may also include a transmit signal path that may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect, as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path that may include circuitry configured to operate on RF signals received from one or more antennas 310, amplify the received signals and provide the amplified versions of the received signals to the RF circuitry 306 for further processing. FEM circuitry 308 may also include a transmit signal path that may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry 308 may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In embodiments where the electronic device is implemented in or by an eNB 110, the electronic device 300 may include network interface circuitry 312. The network interface circuitry 312 may be one or more computer hardware components that connect electronic device 300 to one or more network elements, such as one or more servers within a core network or one or more other eNBs via a wired connection. To this end, the network interface circuitry 312 may support one or more data link layer standards, such as X2 application protocol (AP), S1 AP, Stream Control Transmission Protocol (SCTP), Ethernet, Point-to-Point (PPP), Fiber Distributed Data Interface (FDDI), and/or any other suitable data link layer protocol. Furthermore, the network interface circuitry 312 may include, or may be associated with, processing circuitry, including one or more dedicated processors, logic circuits, field programmable gate arrays (FPGAs), and the like, to provide processing techniques suitable to carry out communications according to the one or more data link layer standards used by the network interface circuitry 312.

In some embodiments, the electronic device 300 may include additional elements such as, for example, a display, a camera, one or more sensors, input/output (I/O) interfaces, and/or buses (not shown). Furthermore, in various embodiments, the various components/elements depicted by FIG. 3 may be rearranged, broken into additional components, combined, and/or omitted altogether.

In embodiments where the electronic device 300 is an eNB 110 or is incorporated into or otherwise part of an eNB 110, encoding circuitry of the baseband circuitry 304 may be to encode a first message. The first message may be to instruct a UE 105 to generate and transmit a report including geo-information of the UE 105. The first message may also include a trigger, which may indicate when (and how) to initiate transmission of the report. Interface circuitry of the eNB 110 may control transmission of the first message to the UE 105, and may control receipt of a second message including the report. Decoding circuitry of the baseband circuitry 304 may be to decode the second message to obtain the report. The report may include the geo-information associated with the UE 105. Central processing circuitry of the baseband circuitry 304 may be to generate the first message, and schedule one or more V2V sidelink transmissions for a UE 105. The schedule may be based on RF resources allocated to a GSA associated with the geo-information from the obtained report. Furthermore, the baseband circuitry 304 and/or other components of the electronic device 300 may be configured to perform the processes described herein, such as processes 500-600 described with respect to FIGS. 5-6.

In embodiments where the electronic device 300 is a UE 105 or is incorporated into or otherwise part of a UE 105, decoding circuitry of the baseband circuitry 304 may be to decode a first message. The first message may comprise an instruction and a trigger. The instruction may instruct the UE 105 to generate and transmit the report, and the trigger may indicate when (or how) to initiate transmission of the report. The report may include geo-information of the UE 105. Central processing circuitry of the baseband circuitry 304 may be to obtain the geo-information of the UE 105 according to the instruction; generate the report including the geo-information; detect the trigger; generate a second message to include the report; initiate transmission of the second message in response to detection of the trigger; and determine, based on the geo-information, one or more RF resources on which to transmit the one or more V2V transmissions based on an obtained/received schedule. Encoding circuitry of the baseband circuitry 304 may be to encode the second message. Further, the decoding circuitry of the baseband circuitry 304 may be to decode a third message. The third message may comprise a schedule for transmission of one or more V2V sidelink transmissions, and the schedule may be based on the geo-information in the report. Furthermore, the baseband circuitry 304 and/or other components of the electronic device 300 may be configured to perform the processes described herein (or parts thereof), such as process 700 described with respect to FIG. 7.

Figure 4:
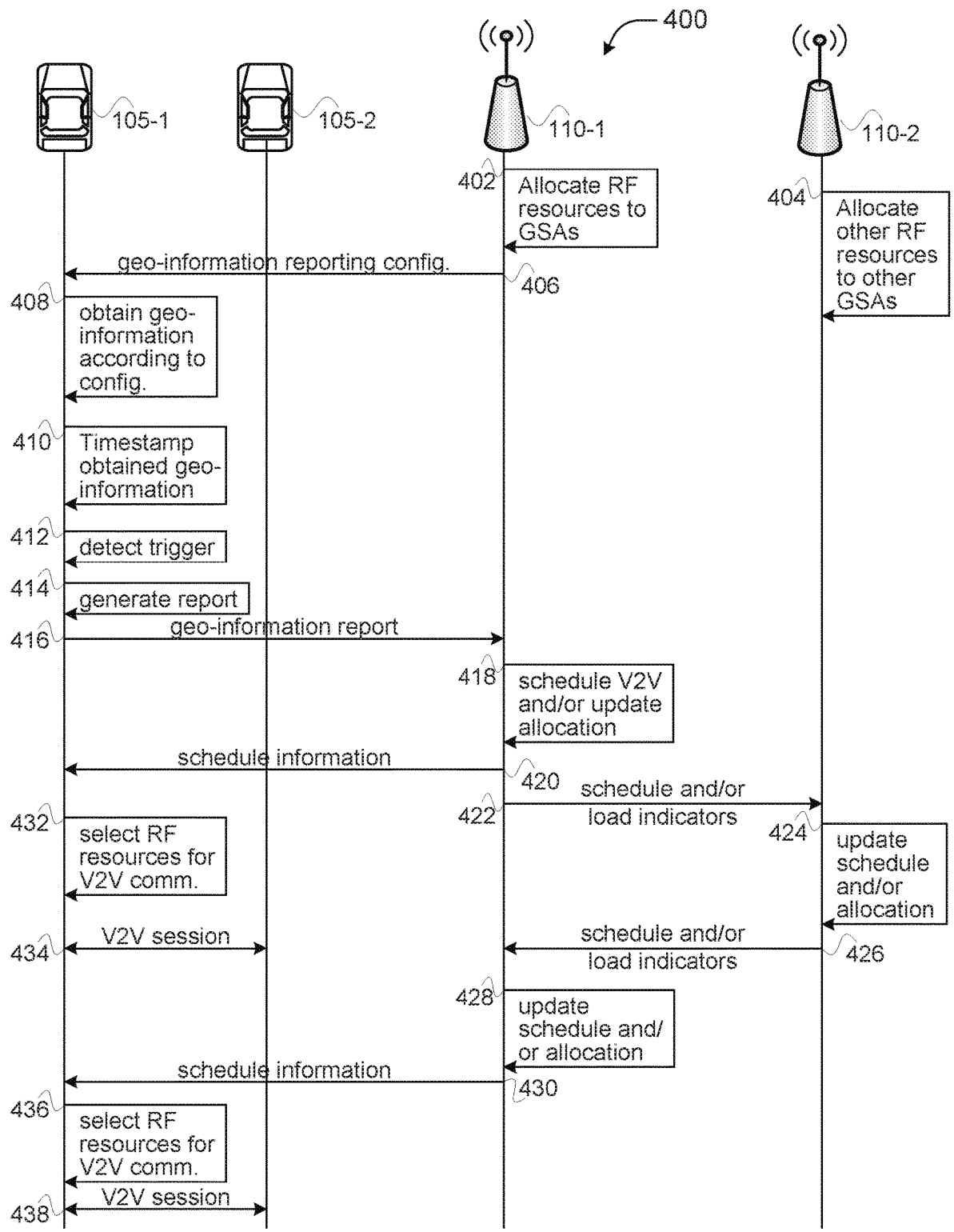
FIG. 4 illustrates a process for geo-information reporting performed by various elements of the cellular communications network of FIG. 1, in accordance with various embodiments.

FIG. 4 illustrates a process 400 for geo-information reporting performed by various elements of the cellular communications network 100 of FIG. 1. For illustrative purposes, the operations of process 400 will be described as being performed by the UE 105-1 acting as an announcing/transmitting UE, the UE 105-2 acting as an annoucee/receiving UE, the eNB 110-1 acting as a serving eNB or serving cell, and the eNB 110-2 acting as a neighboring eNB or neighbor cell. While particular examples and orders of operations are illustrated in FIG. 4, in various embodiments, these operations may be re-ordered, broken into additional operations, combined, and/or omitted altogether. In some embodiments, the operations illustrated in FIG. 4 may be combined with operations described with regard to other embodiments, such as those illustrated by one or more of FIGS. 5-7 and/or one or more operations described with regard to the non-limiting examples provided herein.

Referring to FIG. 4, at operation 402, the eNB 110-1 may allocate RF resources to each of a plurality of GSAs. Meanwhile, at operation 404, the eNB 110-2 may also allocate its own RF resources to a plurality of other GSAs of a geographic area surrounding the eNB 110-2. The RF resources may include frequency resources (for example, subcarriers or resource blocks) and time resources (for example, time resource patterns for transmission, etc.). The eNB 110-1 may also associate a GSAID to each of the plurality of GSAs and the eNB 110-2 may associate a GSAID to each of the plurality of other GSAs.

At operation 406, the eNB 110-1 may provide a geo-information reporting configuration to the UE 105-1. The geo-information reporting configuration may be signaled to the UE 105-1 in an RRC message, system information, or SIB, as discussed previously. The geo-information reporting configuration message may include the report type, report timing information, and trigger discussed previously.

At operation 408, the UE 105-1 may obtain its geo-information according to the geo-information reporting configuration, and at operation 410 the UE 105-1 may timestamp the obtained geo-information according to the geo-information reporting configuration. At operation 412, the UE 105-1 may detect the trigger indicated in the geo-information reporting configuration. Once detected, at operation 414 the UE 105-1 may generate a geo-information report including the obtained geo-information and timestamp. At operation 416, the UE 105-1 may transmit the geo-information report to the eNB 110-1. In other embodiments, the UE 105-1 may generate the report once the geo-information is obtained at operation 408, and may add the timestamp to the report at operation 410. In such embodiments, operation 414 may be omitted.

At operation 418, the eNB 110-1 may schedule V2V communications for the UE 105-1 and/or update the allocation of RF resources based on the obtained geo-information report. The schedule may be a sidelink schedule that is the same or similar to the scheme 200 discussed with regard to FIG. 2. At operation 420, the eNB 110-1 may transmit schedule information (for example, the SPS configuration discussed previously with regard to FIG. 2). In embodiments, the schedule information may also include an RF allocation for the V2V communications. In embodiments, operation 420 may include signaling a transmission interval (for example, a DCI format 5 message) to the UE 105 as previously discussed. At operation 432, the UE 105-1 may select RF resources for the V2V communications according to the schedule information and/or transmission interval, and at operation 434, the UE 105-1 may establish a V2V sidelink communications session (for example, over a sidelink 125) with the UE 105-2. During the V2V sidelink communications session, the UE 105-1 may transmit/receive one or more V2V communications to/from the UE 105-2.

Meanwhile, at operation 422 the eNB 110-1 may also send the schedule and/or load indicators to the eNB 110-2. In embodiments, the schedule or load indicators may be transmitted to the eNB 110-2 in an X2AP message over the X2 interface. In embodiments, the X2AP message may be a load information message that is transmitted to the eNB 110-2 using the load indication procedure. In such embodiments, in addition to the typical load indication information, the load information message may carry additional load information about V2V sidelink RF resources in the serving cell. For example, the load information message of the example embodiments may include a sidelink interference overload indicator (SIOL) IE and/or a sidelink high interference indicator (SHII) IE. The SIOL IE may indicate an interference level of sidelink resources experienced by the serving eNB 110-1 on one or more physical resource blocks (PRBs). The SHII IE may indicate, per PRB, an occurrence of high interference sensitivity for sidelink resources, as seen from the eNB 110-1. In other embodiments, instead of using a load information message that also includes the SHII IE and SIOL IE, the X2AP message may be a dedicated sidelink load information message that includes the SHII IE and SIOL IE. In some embodiments, the X2AP message may also include the eNB 110-1's RF allocation.

Once received, at operation 424 the eNB 110-2 may update its own sidelink schedule and/or allocation of RF resources. For instance, the eNB 110-2 may have scheduled V2V communications according to geo-information it has received from one or more UEs 105 when setting its own sidelink schedule. The eNB 110-2 may also take the information in the X2AP message into account when setting its own sidelink schedule. For example, the eNB 110-2 may refer to the SIOL IE and SHII IE values in the X2AP message, and the eNB 110-2 may try to avoid scheduling V2V communications in its cells at or near the serving cell's edge for the indicated PRBs. By way of another example, the eNB 110-2 may refer to the eNB 110-1's sidelink schedule and/or RF allocation, and the eNB 110-2 may try to avoid scheduling V2V communications on the same RF resources that are already scheduled by the eNB 110-1. The eNB 110-2 may consider the received schedule, allocation, and/or the SIOL IE and SHII IE values valid until reception of a new X2AP message carrying an updated allocation/schedule or updated values for the SIOL and SHII IEs. In addition, the eNB 110-2 may utilize any suitable inter-cell interference coordination (ICIC) technique to update its schedule and/or RF allocation.

At operation 426, the eNB 110-2 may send its own schedule and/or load indicators to the eNB 110-1, and at operation 428, the eNB 110-1 may update its own schedule and/or RF allocation based on the information received from the eNB 110-2. These operations may be performed in the same or similar manner as discussed previously with regard to operations 422 and 424.

At operation 430, the eNB 110-1 may transmit (updated) schedule information to the UE 105-1. At operation 436, the UE 105-1 may select, based on the (updated) schedule information, RF resources for another V2V communications session (which may be the same or different than the RF resources selected at operation 432). At operation 438, the UE 105-1 may establish another V2V sidelink communications session with the UE 105-2 in which the UE 105-1 may transmit or receive one or more V2V transmissions to the UE 105-2. Operations 436 and 438 may be the same or similar as operations 432 and 434 discussed previously.

Figure 5:
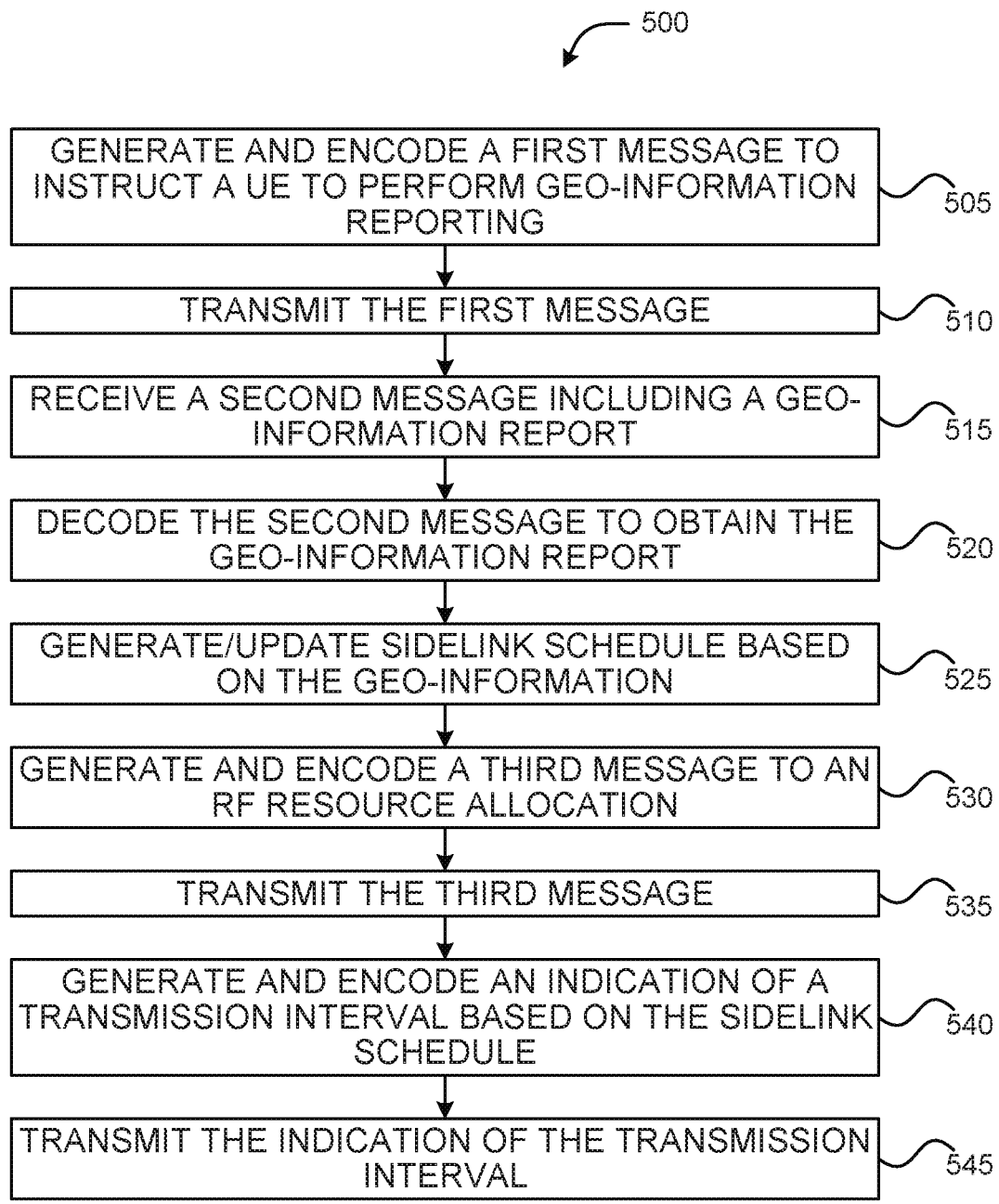
FIG. 5 illustrates a process for configuring a UE for geo-information reporting in accordance with various embodiments.
Figure 6:
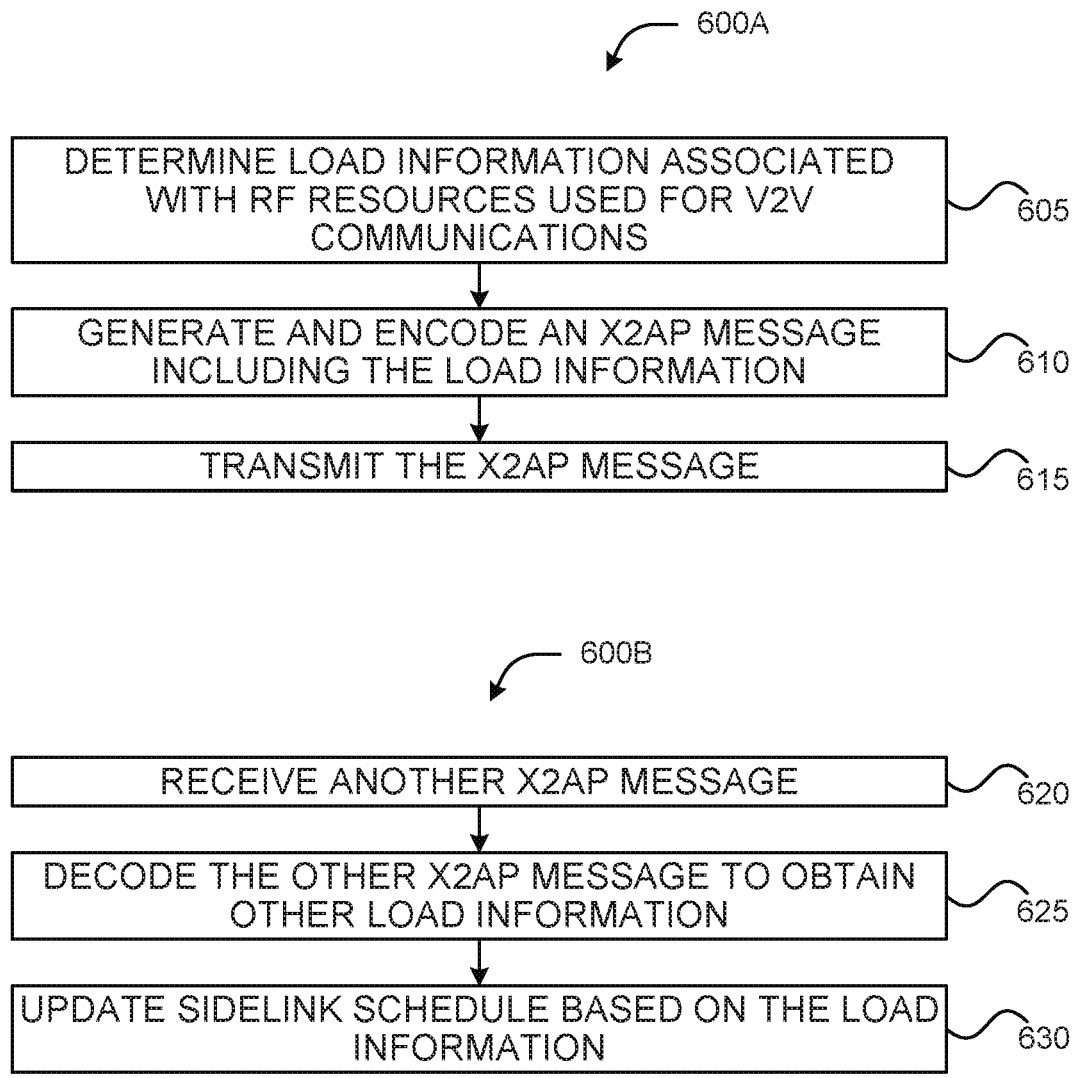
FIG. 6 illustrates processes for inter-cell coordination for V2V communications, in accordance with various embodiments.

FIGS. 5-6 illustrate processes 500 and 600A-B, respectively, which may be performed by an eNB 110. The eNB 110 may include one or more computer-readable media (for example, CRM 304g shown and described with regard to FIG. 3) having instructions or program code, stored thereon, that when executed by one or more processors of the eNB 110 (for example, one or more of processors 304a-e, encoding circuitry 304h, and/or decoding circuitry 304i of the baseband circuitry 304 shown and described with regard to FIG. 3), cause the eNB 110 to perform the processes 500 and/or 600A-B. For illustrative purposes, the operations of processes 500 and 600A-B are described as being performed by eNB 110-1 or components of the eNB 110-1 with elements of network 100, which are described with respect to FIGS. 1-3. However, it should be noted that other similar devices/entities/implementations may operate the processes 500 and 600A-B. While particular examples and orders of operations are illustrated in FIGS. 5-6, in various embodiments, these operations may be re-ordered, broken into additional operations, combined, and/or omitted altogether. In some embodiments, the operations illustrated in FIGS. 5-6 may be combined with operations described with regard to other example embodiments and/or one or more operations described with regard to the non-limiting examples provided herein.

FIG. 5 illustrates the process 500 for configuring a UE 105 for geo-information reporting in accordance with various embodiments. At operation 505, the eNB 110-1 may generate and encode a first message to instruct a UE 105 to perform geo-information reporting. The first message may be the geo-information reporting configuration message discussed previously. In embodiments, processor circuitry (or central processing circuitry) of the eNB 110-1 may generate the first message, and encoding circuitry of the eNB 110-1 may encode the first message for transmission to the UE 105-1. At operation 510, the eNB 110-1 may transmit the first message to the UE 105-1. In embodiments, interface circuitry of the eNB 110-1 may provide data representative of the first message to the RF circuitry 306, and from the data representative of the first message, the RF circuitry 306 may generate signals for a transmit path.

At operation 515, the eNB 110-1 may receive a second message including a geo-information report, and at operation 520, the eNB 110-1 may decode the second message to obtain the geo-information report. In embodiments, the RF circuitry 306 may receive RF signaling from the UE 105-1, and the RF circuitry 306 may pass data representative of the signaling to decoding circuitry of the eNB 110-1 via the interface circuitry of the eNB 110-1. The decoding circuitry of the eNB 110-1 may decode the second message to obtain the geo-information report. The geo-information report may include geo-information (for example, an absolute coordinate, relative coordinate, etc.) and timestamp as discussed previously. The second message may be signaled to the eNB 110-1 according to the L1, L2, and/or L3 procedures discussed previously.

At operation 525, the eNB 110-1 may generate or update a sidelink schedule for V2V communications based on the geo-information contained in the obtained geo-information report. In embodiments, the central processing circuitry of the eNB 110-1 may schedule the one or more V2V sidelink transmissions for the UE 105-1 in a same or similar manner as discussed with regard to FIG. 2. In some embodiments, the central processing circuitry of the eNB 110-1 may also update an allocation of RF resources for V2V communications based on the geo-information from the obtained report.

At operation 530, the eNB 110-1 may generate and encode a third message to include the RF resource allocation, and at operation 535, the eNB 110-1 may transmit the third message to the UE 105-1. In embodiments, the third message may be an SPS configuration message. The third message may be generated and encoded in a similar manner as discussed previously with regard to operation 505, and the third message may be transmitted to the UE 105-1 in a same or similar manner as discussed above with regard to operation 510.

At operation 540, the eNB 110-1 may generate and encode an indication of a transmission interval for the UE 105-1 based on the sidelink schedule, which was generated/updated at operation 525, and at operation 545, the eNB 110-1 may transmit the indication to the UE 105-1. In embodiments, the indication of the transmission interval may be a DCI format 5 message or may be included in a DCI format 5 message. The indication may be generated and encoded in a similar manner as discussed previously with regard to operation 505, and the indication may be transmitted to the UE 105-1 in a same or similar manner as discussed above with regard to operation 510. The UE 105-1 may use the transmission interval to determine or select RF resources to use for V2V communications. After completion of operation 545, process 500 may end or repeat as necessary.

FIG. 6 illustrates processes 600A and 600B for inter-cell coordination for V2V communications, in accordance with various embodiments. With reference to process 600A, at operation 605, the central processing circuitry of the eNB 110-1 may determine load information associated with RF resources used for V2V communications. In some embodiments, the load information may be a sidelink schedule and/or RF resource allocation, while in other embodiments the load information may be an SHII and/or an SLOI discussed previously. At operation 610, the central processing circuitry of the eNB 110-1 may generate an X2AP message, and the encoding circuitry of the eNB 110-1 may encode the X2AP message. At operation 615, the eNB 110-1 may transmit the X2AP message to the eNB 110-2. In embodiments, interface circuitry of the eNB 110-1 may control the transmission of the X2AP message over an X2 interface (for example, backhaul connection 130 shown by FIG. 1) to eNB 110-2.

Referring to process 600B, at operation 620, the interface circuitry of the eNB 110-1 may control receipt of another X2AP message over the X2 interface from eNB 110-2. At operation 625, the decoding circuitry of the eNB 110-1 may decode the other X2AP message to obtain other load information associated with the eNB 110-2. In some embodiments, the other load information may be a sidelink schedule and/or RF allocation for V2V communications within a cell coverage area of eNB 110-2 (for example, cell 115-2 shown by FIG. 1). In embodiments where the other X2AP message is a load information message, the other load information may be a value of an SHII IE and/or an SHOI IE. At operation 630, the central processing circuitry of the eNB 110-1 may update the sidelink schedule based on the load information. In embodiments, the central processing circuitry of the eNB 110-1 may update the schedule according to known ICIC techniques. In various embodiments, the operations of processes 600A and 600B may be combined into a single process or operate in parallel.

Figure 7:
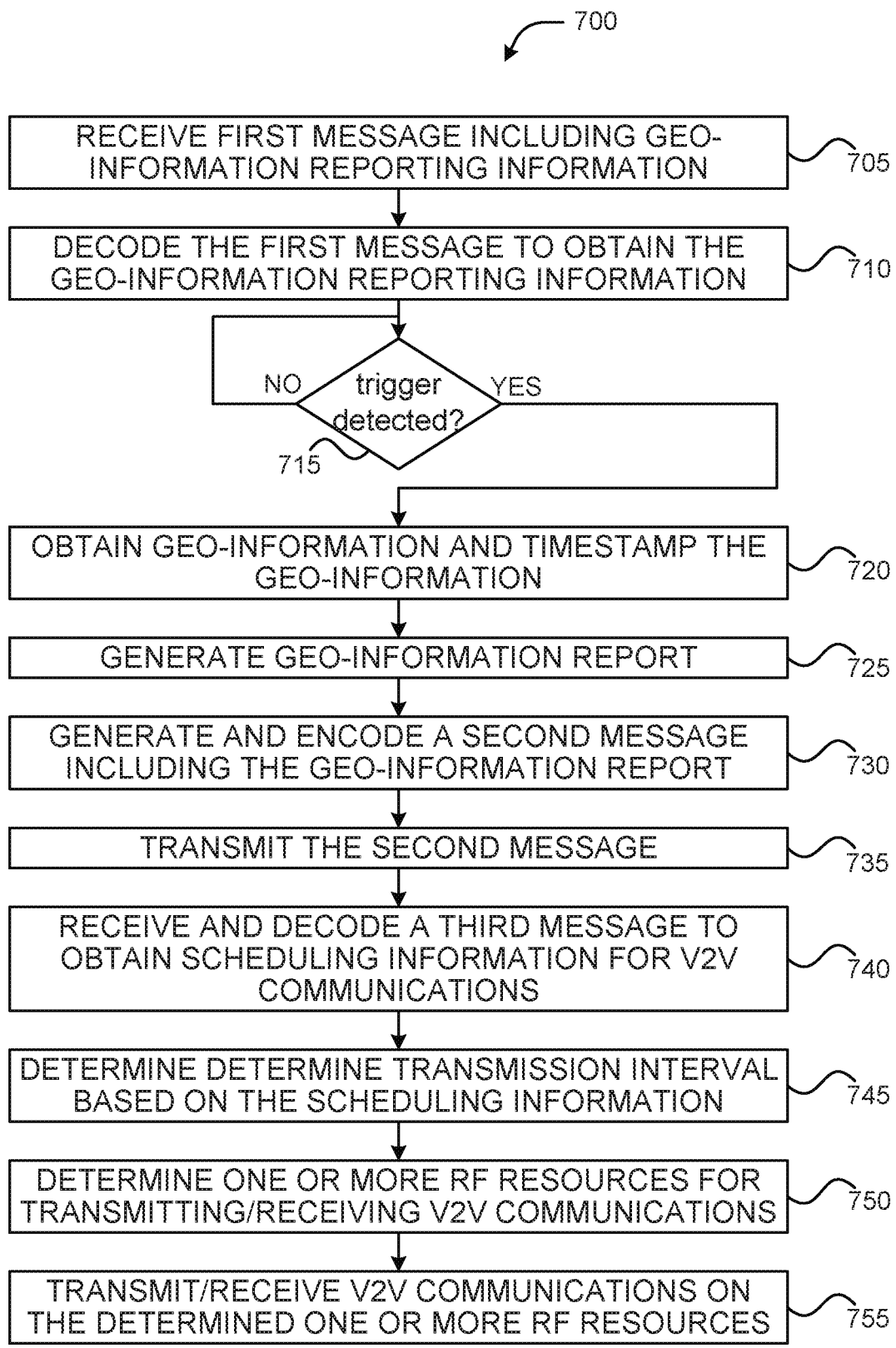
FIG. 7 illustrates a process for reporting geo-information for V2V communications, in accordance with example embodiments.

FIG. 7 illustrates a process 700 for reporting geo-information for V2V communications, in accordance with a second type of example embodiments. Process 700 may be performed by a UE 105, which may include one or more computer-readable media (for example, CRM 304g shown and described with regard to FIG. 3) having instructions or program code, stored thereon, that when executed by one or more processors of the UE 105 (for example, one or more of processors 304a-e, encoding circuitry 304h, and/or decoding circuitry 304i of the baseband circuitry 304 shown and described with regard to FIG. 3), causes the UE 105 to perform process 700. For illustrative purposes, the operations of process 700 are described as being performed by UE 105-1 or components of the UE 105-1 with elements of network 100, which are described with respect to FIGS. 1-3. However, it should be noted that other similar devices/entities/implementations may operate process 700. While particular examples and orders of operations are illustrated in FIG. 7, in various embodiments, these operations may be re-ordered, broken into additional operations, combined, and/or omitted altogether. In some embodiments, the operations illustrated in FIG. 7 may be combined with operations described with regard to other example embodiments and/or one or more operations described with regard to the non-limiting examples provided herein.

At operation 705, interface circuitry of the UE 105-1 may control receipt of a first message including geo-information reporting information. The first message may be signaled to the UE 105-1 using higher layer signaling as discussed previously. At operation 710, decoding circuitry of the UE 105-1 may decode the first message to obtain the geo-information reporting information. The geo-information reporting information may include a report type, timestamp information, trigger, and other information as discussed previously.

At operation 715, the central processing circuitry of the UE 105-1 may determine whether the trigger has been detected. If at operation 715 the central processing circuitry of the UE 105-1 determines that the trigger has not been detected, the central processing circuitry of the UE 105-1 may loop back to operation 715 to monitor for a trigger event/period. If at operation 715 the central processing circuitry of the UE 105-1 determines that the trigger has been detected, the central processing circuitry of the UE 105-1 may proceed to operation 720 to obtain the geo-information.

At operation 720, the central processing circuitry of the UE 105-1 may obtain geo-information of the UE 105-1 and timestamp the obtained geo-information. The central processing circuitry of the UE 105-1 may obtain an absolute coordinate or relative coordinate of the UE 105-1's position based on the report type included in the geo-information reporting information. The central processing circuitry of the UE 105-1 may then explicitly or implicitly timestamp the obtained geo-information according to the timestamp information included in the geo-information reporting information. At operation 725, the central processing circuitry of the UE 105-1 may generate a geo-information report that includes the obtained geo-information and the timestamp.

At operation 730, the central processing circuitry of the UE 105-1 may generate a second message that includes the geo-information report, and the encoding circuitry of the UE 105-1 may encode the second message for transmission to the eNB 110-1. The second message may be an L1, L2, and/or L3 message as discussed previously. At operation 735, the central processing circuitry of the UE 105-1 may control the RF circuitry 306 to transmit the second message to the eNB 110-1. The second message may be signaled to the eNB 110-1 using the L1, L2, and/or L3 procedures discussed previously.

At operation 740, the interface circuitry of the UE 105-1 may control receipt of a third message from the eNB 110-1, and the decoding circuitry of the UE 105-1 may decode the third message to obtain scheduling information for V2V communications. At operation 745, the central processing circuitry of the UE 105-1 may use the scheduling information to determine a transmission interval in which to transmit one or more V2V sidelink communications. In embodiments, the scheduling information may be an SPS configuration, which may indicate a window in which the central processing circuitry should monitor a PDCCH for DCI format 5 messages. Based on the monitoring, the interface circuitry may control receipt of a DCI format 5 message, and the central processing circuitry of the UE 105-1 may determine the transmission interval from the format 5 message. At operation 750, the central processing circuitry of the UE 105-1 may determine or select one or more RF resources in the transmission interval on which to transmit the one or more V2V sidelink communications based on the geo-information. At operation 755, the interface circuitry of the UE 105-1 may control transmission or control receipt of one or more V2V communications on the determined one or more RF resources. After completion of operation 755, process 700 may end or repeat as necessary.

Figure 8:
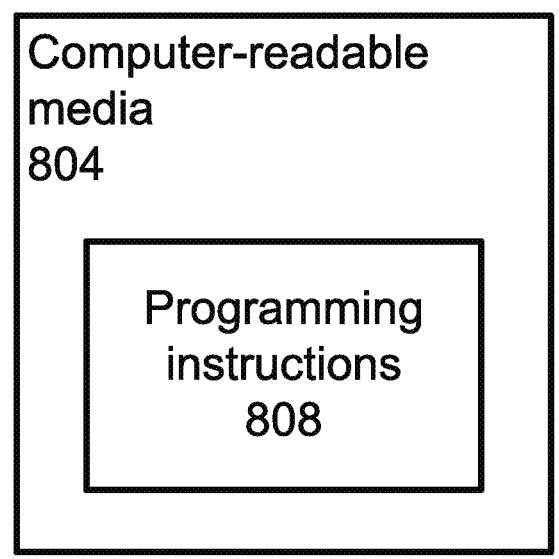
FIG. 8 illustrates an example computer-readable media, in accordance with various example embodiments.

FIG. 8 illustrates an example computer-readable media 804 that may be suitable for use to store instructions that cause an apparatus, in response to execution of the instructions by the apparatus, to practice selected aspects of the present disclosure. In some embodiments, the computer-readable media 804 may be non-transitory. In some embodiments, computer-readable media 804 may correspond to CRM 302*b*, CRM 304*g*, and/or any other computer-readable media discussed herein. As shown, computer-readable storage medium 804 may include programming instructions 808. Programming instructions 808 may be configured to enable a device, for example, electronic device 300, a UE such as one of the UEs 105, an eNB such as one of the eNBs 110, or some other suitable device, in response to execution of the programming instructions 808, to implement (aspects of) any of the methods or elements described throughout this disclosure related to geo-information reporting and/or V2V sidelink communications. In some embodiments, programming instructions 808 may be disposed on computer-readable media 804 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

Some non-limiting examples are provided below.

Example 1 may include an apparatus to be implemented in an Evolved Node B ("eNB"), the apparatus comprising: encoding circuitry to encode a first message, wherein the first message is to instruct a user equipment ("UE") to generate and transmit a report and the first message is to indicate a trigger to initiate transmission of the report; decoding circuitry to decode a second message to obtain the report, wherein the report is to include geo-information associated with the UE; central processing circuitry to generate the first message, and schedule one or more vehicle-to-vehicle ("V2V") sidelink transmissions for the UE, wherein the schedule is based on radio frequency ("RF") resources allocated to a geographical sub-area ("GSA") associated with the geo-information from the obtained report.

Example 2 may include the apparatus of example 1 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 3 may include the apparatus of example 2 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 4 may include the apparatus of example 2 or 3 and/or some other examples herein, wherein when the report type indicates an absolute coordinate system, the geo-information comprises World Geodetic System 84 ("WGS-84") coordinates and the report is to be generated in a Global Positioning System ("GPS") message format, or the geo-information comprises Long Term Evolution Positioning Protocol ("LPP") coordinates and the report is to be generated in an LPP format.

Example 5 may include the apparatus of example 2 or 3 and/or some other examples herein, wherein when the report type indicates a relative coordinate system, the geo-information comprises coordinates of the UE that are relative to a predetermined reference point or the geo-information comprises a GSA identifier ("GSAID") in which the UE is located.

Example 6 may include the apparatus of example 1 and/or some other examples herein, wherein the GSA is among a plurality of GSAs, and the central processing circuitry is to: allocate the RF resources to each GSA of the plurality of GSAs; and associate each GSA of the plurality of GSAs with a GSAID.

Example 7 may include the apparatus of example 6 and/or some other examples herein, wherein, to allocate the RF resources to each GSA, the central processing circuitry is to: assign the RF resources to a plurality of sidelink resource pools ("SRPs") wherein individual SRPs of the plurality of SRPs have a length equal to a sidelink control ("SC") period and individual SRPs include a plurality of subframes; and associate individual SRPs of the plurality of SRPs with an SRP identifier ("SRPID").

Example 8 may include the apparatus of example 7 and/or some other examples herein, wherein the central processing circuitry is to: generate a third message, wherein the third message is to indicate the allocation of the RF resources and a window to monitor for Downlink Control Information ("DCI") format 5 transmissions, and generate, according to a semi-persistent scheduling algorithm, the schedule to include a transmission interval for the UE to transmit the one or more V2V transmissions, wherein the transmission interval comprises one or more SRPs of the plurality of SRPs; and the encoding circuitry is to encode the third message and a DCI format 5 message for transmission to the UE, wherein the DCI format 5 message is to indicate the transmission interval.

Example 9 may include the apparatus of example 8 and/or some other examples herein, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

Example 10 may include the apparatus of example 8 and/or some other examples herein, wherein the central processing circuitry is to generate a fourth message, wherein the fourth message comprises: a sidelink overload indicator ("SLOI") wherein a value of an SLOI IE indicates a level of interference experienced by the eNB on one or more physical resource blocks of the plurality of subframes, a sidelink high interference indicator ("SLHII") wherein a value of an SLHII IE indicates an occurrence of high interference sensitivity experienced by the eNB on the one or more physical resource blocks of the plurality of subframes, and an SRPID or GSAID associated with the SLHII and the SLOI; and the encoding circuitry is to encode the fourth message.

Example 11 may include the apparatus of example 10 and/or some other examples herein, wherein the decoding circuitry is to decode a fifth message to obtain a value of another SLHII IE, a value of another SLOI IE, and another SRPID or another GSAID associated with the other SLHII and the other SLOI; and the central processing circuitry is to schedule the one or more V2V sidelink transmissions based on the value of the other SLHII IE, and the value of the other SLOI IE.

Example 12 may include the apparatus of example 11 and/or some other examples herein, wherein the fourth message further comprises a mapping of the GSAIDs to the GSAs and the allocation of the RF resources to the GSAs, and wherein the fifth message further comprises another mapping of other GSAIDs to other GSAs, and another allocation of other RF resources to the other GSAs.

Example 13 may include the apparatus of example 12 and/or some other examples herein, further comprising interface circuitry to: control transmission of the first message and the third message over an air interface, and control receipt of the second message over the air interface; and control transmission of the fourth message over an X2 interface, and control receipt of the fifth message over the X2 interface.

Example 14 may include the apparatus of example 12 and/or some other examples herein, wherein the fourth message and the fifth message are X2 application protocol ("X2AP") messages, and wherein the fifth message is one of a Load Information message or a sidelink load indicator message.

Example 15 may include the apparatus of any one of examples 1 and 12-14 and/or some other examples herein, wherein the first message is an RRC Connection Reconfiguration message including a measurement configuration ("MeasConfig") IE, wherein the MeasConfig IE includes an instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 16 may include the apparatus of example 15 and/or some other examples herein, wherein when the second message is a MAC CE message, the MAC CE message includes a MAC header, and wherein a logical channel identifier ("LCID") in the MAC header is set to a first value to indicate that the report includes geo-information as an absolute coordinate or the LCID is set to a second value to indicate that the report includes geo-information as a relative coordinate.

Example 17 may include the apparatus of example 15 and/or some other examples herein, wherein the RRC message is not a measurement report including a Location Information ("LocationInfo") information element ("IE").

Example 18 may include an apparatus to be implemented in an Evolved Node B ("eNB"), the apparatus comprising: means for generating and encoding a first message, wherein the first message is to instruct a user equipment ("UE") to generate and transmit a report and the first message is to indicate a trigger to initiate transmission of the report; means for obtaining and decoding a second message to obtain the report, wherein the report is to include geo-information associated with the UE; means for scheduling one or more vehicle-to-vehicle ("V2V") sidelink transmissions for the UE, wherein the schedule is based on radio frequency ("RF") resources allocated to a geographical sub-area ("GSA") associated with the geo-information from the obtained report.

Example 19 may include the apparatus of example 18 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 20 may include the apparatus of example 19 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 21 may include the apparatus of example 19 or 20 and/or some other examples herein, wherein when the report type indicates an absolute coordinate system, the geo-information comprises World Geodetic System 84 ("WGS-84") coordinates and the report is to be generated in a Global Positioning System ("GPS") message format, or the geo-information comprises Long Term Evolution Positioning Protocol ("LPP") coordinates and the report is to be generated in an LPP format.

Example 22 may include the apparatus of example 19 or 20 and/or some other examples herein, wherein when the report type indicates a relative coordinate system, the geo-information comprises coordinates of the UE that are relative to a predetermined reference point or the geo-information comprises a GSA identifier ("GSAID") in which the UE is located.

Example 23 may include the apparatus of example 18 and/or some other examples herein, wherein the GSA is among a plurality of GSAs, and the apparatus further comprises: means for allocating the RF resources to each GSA of the plurality of GSAs; and means for associating each GSA of the plurality of GSAs with a GSAID.

Example 24 may include the apparatus of example 23 and/or some other examples herein, wherein the means for allocating the RF resources to each GSA comprises: means for assigning the RF resources to a plurality of sidelink resource pools ("SRPs") wherein individual SRPs of the plurality of SRPs have a length equal to a sidelink control ("SC") period and individual SRPs include a plurality of subframes; and means for associating individual SRPs of the plurality of SRPs with an SRP identifier ("SRPID").

Example 25 may include the apparatus of example 24 nd/or some other examples herein, further comprising: means for generating a third message, wherein the third message is to indicate the allocation of the RF resources and a window to monitor for Downlink Control Information ("DCI") format 5 transmissions, and means for generating, according to a semi-persistent scheduling algorithm, the schedule to include a transmission interval for the UE to transmit the one or more V2V transmissions, wherein the transmission interval comprises one or more SRPs of the plurality of SRPs; and means for encoding the third message and a DCI format 5 message for transmission to the UE, wherein the DCI format 5 message is to indicate the transmission interval.

Example 26 may include the apparatus of example 25 and/or some other examples herein, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

Example 27 may include the apparatus of example 25 and/or some other examples herein, further comprising: means for generating and encoding a fourth message, wherein the fourth message comprises: a sidelink overload indicator ("SLOI") wherein a value of an SLOI IE indicates a level of interference experienced by the eNB on one or more physical resource blocks of the plurality of subframes, a sidelink high interference indicator ("SLHII") wherein a value of an SLHII IE indicates an occurrence of high interference sensitivity experienced by the eNB on the one or more physical resource blocks of the plurality of subframes, and an SRPID or GSAID associated with the SLHII and the SLOI.

Example 28 may include the apparatus of example 27 and/or some other examples herein, further comprising: means for decoding a fifth message to obtain a value of another SLHII IE, a value of another SLOI IE, and another SRPID or another GSAID associated with the other SLHII and the other SLOI; and means for scheduling the one or more V2V sidelink transmissions based on the value of the other SLHII IE, and the value of the other SLOI IE.

Example 29 may include the apparatus of example 28 and/or some other examples herein, wherein the fourth message further comprises a mapping of the GSAIDs to the GSAs and the allocation of the RF resources to the GSAs, and wherein the fifth message further comprises another mapping of other GSAIDs to other GSAs, and another allocation of other RF resources to the other GSAs.

Example 30 may include the apparatus of example 29 and/or some other examples herein, further comprising: means for transmitting the first message and the third message over an air interface, and control receipt of the second message over the air interface; and means for transmitting the fourth message over an X2 interface, and control receipt of the fifth message over the X2 interface.

Example 31 may include the apparatus of example 29 and/or some other examples herein, wherein the fourth message and the fifth message are X2 application protocol ("X2AP") messages, and wherein the fifth message is one of a Load Information message or a sidelink load indicator message.

Example 32 may include the apparatus of any one of examples 18 and 29-31 and/or some other examples herein, wherein the first message is an RRC Connection Reconfiguration message including a measurement configuration ("MeasConfig") IE, wherein the MeasConfig IE includes an instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 33 may include the apparatus of example 32 and/or some other examples herein, wherein when the second message is a MAC CE message, the MAC CE message includes a MAC header, and wherein a logical channel identifier ("LCID") in the MAC header is set to a first value to indicate that the report includes geo-information as an absolute coordinate or the LCID is set to a second value to indicate that the report includes geo-information as a relative coordinate.

Example 34 may include the apparatus of example 32 and/or some other examples herein, wherein the RRC message is not a measurement report including a Location Information ("LocationInfo") information element ("IE").

Example 35 may include a computer-implemented method to be performed by an Evolved Node B ("eNB"), the method comprising: generating and encoding a first message, wherein the first message is to instruct a user equipment ("UE") to generate and transmit a report and the first message is to indicate a trigger to initiate transmission of the report; obtaining and decoding a second message to obtain the report, wherein the report is to include geo-information associated with the UE; scheduling one or more vehicle-to-vehicle ("V2V") sidelink transmissions for the UE, wherein the schedule is based on radio frequency ("RF") resources allocated to a geographical sub-area ("GSA") associated with the geo-information from the obtained report.

Example 36 may include the method of example 35 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 37 may include the method of example 36 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 38 may include the method of example 36 or 37 and/or some other examples herein, wherein when the report type indicates an absolute coordinate system, the geo-information comprises World Geodetic System 84 ("WGS-84") coordinates and the report is to be generated in a Global Positioning System ("GPS") message format, or the geo-information comprises Long Term Evolution Positioning Protocol ("LPP") coordinates and the report is to be generated in an LPP format.

Example 39 may include the method of example 36 or 37 and/or some other examples herein, wherein when the report type indicates a relative coordinate system, the geo-information comprises coordinates of the UE that are relative to a predetermined reference point or the geo-information comprises a GSA identifier ("GSAID") in which the UE is located.

Example 40 may include the method of example 35 and/or some other examples herein, wherein the GSA is among a plurality of GSAs, and the method further comprises: allocating the RF resources to each GSA of the plurality of GSAs; and associating each GSA of the plurality of GSAs with a GSAID.

Example 41 may include the method of example 40 and/or some other examples herein, wherein allocating the RF resources to each GSA comprises: assigning the RF resources to a plurality of sidelink resource pools ("SRPs") wherein individual SRPs of the plurality of SRPs have a length equal to a sidelink control ("SC") period and individual SRPs include a plurality of subframes; and associating individual SRPs of the plurality of SRPs with an SRP identifier ("SRPID").

Example 42 may include the method of example 41 and/or some other examples herein, further comprising: generating a third message, wherein the third message is to indicate the allocation of the RF resources and a window to monitor for Downlink Control Information ("DCI") format 5 transmissions, and generating, according to a semi-persistent scheduling algorithm, the schedule to include a transmission interval for the UE to transmit the one or more V2V transmissions, wherein the transmission interval comprises one or more SRPs of the plurality of SRPs; and encoding the third message and a DCI format 5 message for transmission to the UE, wherein the DCI format 5 message is to indicate the transmission interval.

Example 43 may include the method of example 42 and/or some other examples herein, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

Example 44 may include the method of example 42 and/or some other examples herein, further comprising: generating and encoding a fourth message, wherein the fourth message comprises: a sidelink overload indicator ("SLOI") wherein a value of an SLOI IE indicates a level of interference experienced by the eNB on one or more physical resource blocks of the plurality of subframes, a sidelink high interference indicator ("SLHII") wherein a value of an SLHII IE indicates an occurrence of high interference sensitivity experienced by the eNB on the one or more physical resource blocks of the plurality of subframes, and an SRPID or GSAID associated with the SLHII and the SLOI.

Example 45 may include the method of example 44 and/or some other examples herein, further comprising: decoding a fifth message to obtain a value of another SLHII IE, a value of another SLOI IE, and another SRPID or another GSAID associated with the other SLHII and the other SLOI; and scheduling the one or more V2V sidelink transmissions based on the value of the other SLHII IE, and the value of the other SLOI IE.

Example 46 may include the method of example 45 and/or some other examples herein, wherein the fourth message further comprises a mapping of the GSAIDs to the GSAs and the allocation of the RF resources to the GSAs, and wherein the fifth message further comprises another mapping of other GSAIDs to other GSAs, and another allocation of other RF resources to the other GSAs.

Example 47 may include the method of example 46 and/or some other examples herein, further comprising: transmitting the first message and the third message over an air interface, and control receipt of the second message over the air interface; and transmitting the fourth message over an X2 interface, and control receipt of the fifth message over the X2 interface.

Example 48 may include the method of example 46 and/or some other examples herein, wherein the fourth message and the fifth message are X2 application protocol ("X2AP") messages, and wherein the fifth message is one of a Load Information message or a sidelink load indicator message.

Example 49 may include the method of any one of examples 35 and 46-48 and/or some other examples herein, wherein the first message is an RRC Connection Reconfiguration message including a measurement configuration ("MeasConfig") IE, wherein the MeasConfig IE includes an instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 50 may include the method of example 49 and/or some other examples herein, wherein when the second message is a MAC CE message, the MAC CE message includes a MAC header, and wherein a logical channel identifier ("LCID") in the MAC header is set to a first value to indicate that the report includes geo-information as an absolute coordinate or the LCID is set to a second value to indicate that the report includes geo-information as a relative coordinate.

Example 51 may include the method of example 49 and/or some other examples herein, wherein the RRC message is not a measurement report including a Location Information ("LocationInfo") information element ("IE").

Example 52A may include one or more computer-readable media including program code, which when executed by one or more processors of an eNB, causes the eNB to perform the method of examples 35-51 and/or some other examples herein. The one or more computer-readable media may be non-transitory one or more computer-readable media Example 52 may include one or more computer-readable media including program code, which when executed by one or more processors of an Evolved Node B ("eNB") causes the eNB to: generate and encode a first message, wherein the first message is to instruct a user equipment ("UE") to generate and transmit a report and the first message is to indicate a trigger to initiate transmission of the report; obtain and decode a second message to obtain the report, wherein the report is to include geo-information associated with the UE; and schedule one or more vehicle-to-vehicle ("V2V") sidelink transmissions for the UE, wherein the schedule is based on radio frequency ("RF") resources allocated to a geographical sub-area ("GSA") associated with the geo-information from the obtained report. The one or more computer-readable media may be non-transitory one or more computer-readable media.

Example 53 may include the one or more computer-readable media of example 52 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 54 may include the one or more computer-readable media of example 53 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 55 may include the one or more computer-readable media of example 53 or 54 and/or some other examples herein, wherein when the report type indicates an absolute coordinate system, the geo-information comprises World Geodetic System 84 ("WGS-84") coordinates and the report is to be generated in a Global Positioning System ("GPS") message format, or the geo-information comprises Long Term Evolution Positioning Protocol ("LPP") coordinates and the report is to be generated in an LPP format.

Example 56 may include the one or more computer-readable media of example 53 or 54 and/or some other examples herein, wherein when the report type indicates a relative coordinate system, the geo-information comprises coordinates of the UE that are relative to a predetermined reference point or the geo-information comprises a GSA identifier ("GSAID") in which the UE is located.

Example 57 may include the one or more computer-readable media of example 52 and/or some other examples herein, wherein the GSA is among a plurality of GSAs, and wherein the eNB, in response to execution of the program code, is to: allocate the RF resources to each GSA of the plurality of GSAs; and associate each GSA of the plurality of GSAs with a GSAID.

Example 58 may include the one or more computer-readable media of example 57 and/or some other examples herein, wherein to allocate the RF resources to each GSA, the eNB, in response to execution of the program code, is to: assign the RF resources to a plurality of sidelink resource pools ("SRPs") wherein individual SRPs of the plurality of SRPs have a length equal to a sidelink control ("SC") period and individual SRPs include a plurality of subframes; and associate individual SRPs of the plurality of SRPs with an SRP identifier ("SRPID").

Example 59 may include the one or more computer-readable media of example 58 and/or some other examples herein, wherein the eNB, in response to execution of the program code, is to: generate a third message, wherein the third message is to indicate the allocation of the RF resources and a window to monitor for Downlink Control Information ("DCI") format 5 transmissions, and generate, according to a semi-persistent scheduling algorithm, the schedule to include a transmission interval for the UE to transmit the one or more V2V transmissions, wherein the transmission interval comprises one or more SRPs of the plurality of SRPs; and encode the third message and a DCI format 5 message for transmission to the UE, wherein the DCI format 5 message is to indicate the transmission interval.

Example 60 may include the one or more computer-readable media of example 59 and/or some other examples herein, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

Example 61 may include the one or more computer-readable media of example 59 and/or some other examples herein, wherein the eNB, in response to execution of the program code, is to: generate and encode a fourth message, wherein the fourth message comprises: a sidelink overload indicator ("SLOI") wherein a value of an SLOI IE indicates a level of interference experienced by the eNB on one or more physical resource blocks of the plurality of subframes, a sidelink high interference indicator ("SLHII") wherein a value of an SLHII IE indicates an occurrence of high interference sensitivity experienced by the eNB on the one or more physical resource blocks of the plurality of subframes, and an SRPID or GSAID associated with the SLHII and the SLOI.

Example 62 may include the one or more computer-readable media of example 61 and/or some other examples herein, wherein the eNB, in response to execution of the program code, is to: decode a fifth message to obtain a value of another SLHII IE, a value of another SLOI IE, and another SRPID or another GSAID associated with the other SLHII and the other SLOI; and schedule the one or more V2V sidelink transmissions based on the value of the other SLHII IE, and the value of the other SLOI IE.

Example 63 may include the one or more computer-readable media of example 62 and/or some other examples herein, wherein the fourth message further comprises a mapping of the GSAIDs to the GSAs and the allocation of the RF resources to the GSAs, and wherein the fifth message further comprises another mapping of other GSAIDs to other GSAs, and another allocation of other RF resources to the other GSAs.

Example 64 may include the one or more computer-readable media of example 63 and/or some other examples herein, wherein the eNB, in response to execution of the program code, is to: control transmission of the first message and the third message over an air interface, and control receipt of the second message over the air interface; and control transmission of the fourth message over an X2 interface, and control receipt of the fifth message over the X2 interface.

Example 65 may include the one or more computer-readable media of example 63 and/or some other examples herein, wherein the fourth message and the fifth message are X2 application protocol ("X2AP") messages, and wherein the fifth message is one of a Load Information message or a sidelink load indicator message.

Example 66 may include the one or more computer-readable media of examples 52 and/or 63-65 and/or some other examples herein, wherein the first message is an RRC Connection Reconfiguration message including a measurement configuration ("MeasConfig") IE, wherein the MeasConfig IE includes an instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 67 may include the one or more computer-readable media of example 66 and/or some other examples herein, wherein when the second message is a MAC CE message, the MAC CE message includes a MAC header, and wherein a logical channel identifier ("LCID") in the MAC header is set to a first value to indicate that the report includes geo-information as an absolute coordinate or the LCID is set to a second value to indicate that the report includes geo-information as a relative coordinate.

Example 68 may include the one or more computer-readable media of example 66 and/or some other examples herein, wherein the RRC message is not a measurement report including a Location Information ("LocationInfo") information element ("IE").

Example 69 may include an apparatus to be implemented in a user equipment ("UE"), the apparatus comprising: decoding circuitry to decode a first message and a third message, wherein the first message comprises an instruction to generate and transmit a report, and a trigger to initiate transmission of the report, wherein the report is to include geo-information of the UE, wherein the third message comprises a schedule for transmission of one or more vehicle-to-vehicle ("V2V") sidelink transmissions, and wherein the schedule is based on the geo-information in the report; central processing circuitry to obtain the geo-information of the UE according to the instruction, generate the report including the geo-information, detect the trigger, generate a second message to include the report, initiate transmission of the second message in response to detection of the trigger, and determine, based on the geo-information, one or more radio frequency ("RF") resources on which to transmit the one or more V2V transmissions based on the schedule; and encoding circuitry to encode the second message for transmission.

Example 70 may include the apparatus of example 69 and/or some other examples herein, further comprising: interface circuitry to control transmission or receipt of one or more V2V communications on the determined one or more RF resources in a transmission interval.

Example 71 may include the apparatus of example 69 and/or some other examples herein, wherein the trigger indicates to transmit the report according to a reporting period or when a predefined event occurs.

Example 72 may include the apparatus of example 71 and/or some other examples herein, wherein the reporting period indicates a minimum reporting periodicity or a maximum reporting periodicity, and the predefined event is one or more of a change in position, a change in travel direction, or a change in velocity.

Example 73 may include the apparatus of example 72 and/or some other examples herein, wherein, when the trigger indicates to transmit the report when the predefined event occurs, the change in velocity is to indicate that the central processing circuitry is to reduce a frequency at which reports are generated and transmitted as a velocity of the UE is reduced and the central processing circuitry is to increase the frequency at which reports are generated and transmitted as the velocity of the UE is increased.

Example 74 may include the apparatus of example 72 or 73 and/or some other examples herein, wherein, when the trigger indicates to transmit the report when the predefined event occurs, the change in position is to indicate that transmission of the report is to be triggered when the UE has travelled a specified distance from a position at which a previous report was previously transmitted.

Example 75 may include the apparatus of example 69 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 76 may include the apparatus of example 75 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 77 may include the apparatus of example 75 or 76 and/or some other examples herein, wherein, when the report type indicates an absolute coordinate system, the central processing circuitry is to: obtain the geo-information as World Geodetic System 84 ("WGS-84") coordinates, and generate the report in a Global Positioning System ("GPS") message format; or obtain the geo-information as Long Term Evolution Positioning Protocol ("LPP") coordinates, and generate the report in an LPP format.

Example 78 may include the apparatus of example 75 or 76 and/or some other examples herein, wherein the geo-information is based on a geographical sub-area ("GSA") of a plurality of GSAs in which the UE is located, and wherein each GSA of the plurality of GSAs are associated with a GSA identifier ("GSAID") and wherein, when the report type indicates a relative coordinate system, the central processing circuitry is to: obtain the geo-information as a coordinate of the UE that is relative to a predetermined reference point; or obtain the geo-information through identification of a GSAID in which the UE is located.

Example 79 may include the apparatus of example 69, 77, or 78 and/or some other examples herein, wherein the RF resources are associated with a corresponding one of a plurality of sidelink resource pools ("SRPs") wherein individual SRPs of the plurality of SRPs have a length equal to a sidelink control ("SC") period and include a plurality of subframes, and wherein individual SRPs of the plurality of SRPs are associated with an SRP identifier ("SRPID").

Example 80 may include the apparatus of example 79 and/or some other examples herein, wherein the central processing circuitry is to determine one or more RF resources on which to transmit V2V sidelink transmissions based on the schedule and an SRP associated with a current GSA in which the UE is located.

Example 81 may include the apparatus of example 80 and/or some other examples herein, wherein the decoding circuitry is to decode a Downlink Control Information ("DCI") format 5 message to obtain sidelink control information ("SCI") and wherein to determine the one or more RF resources on which to transmit V2V sidelink transmissions, the central processing circuitry is to: determine a transmission interval based on the SCI, wherein the transmission interval includes one or more SRPs of the plurality of SRPs; and select the one or more RF resources on which to transmit the V2V sidelink transmissions within the one or more SRPs of the transmission interval.

Example 82 may include the apparatus of example 80 and/or some other examples herein, wherein the central processing circuitry is to: monitor a physical downlink control channel ("PDCCH") for the DCI format 5 message.

Example 83 may include the apparatus of any one of examples 80-82 and/or some other examples herein, wherein the plurality of subframes of individual SRPs includes a physical sidelink control channel ("PSCCH") subframe and a set of physical sidelink shared channel ("PSSCH") subframes, and wherein the transmission interval is to begin at one of a PSCCH subframe nearest in time to receipt of the DCI format 5 message, a predefined PSCCH subframe indicated by the DCI format 5 message, or a predefined PSSCH subframe indicated by the DCI format 5 message, and wherein the transmission interval is to span a predefined number of PSSCH subframes or span a predefined period of time.

Example 84 may include the apparatus of example 69 and/or some other examples herein, further comprising interface circuitry to: control receipt of the first message and the second message; and control transmission of the third message.

Example 85 may include the apparatus of example 69 or 84 and/or some other examples herein, wherein the first message is an RRC Connection Reconfiguration message including a measurement configuration ("MeasConfig") IE, wherein the MeasConfig IE includes the instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 86 may include the apparatus of example 85 and/or some other examples herein, wherein when the second message is a MAC CE message, the MAC CE message includes a MAC header, and wherein the central processing circuitry is to: set a logical channel ID in the MAC header to a first value to indicate that the report includes geo-information as an absolute coordinate; or set the logical channel ID to a second value to indicate that the report includes geo-information as a relative coordinate.

Example 87 may include the apparatus of example 85 and/or some other examples herein, wherein the RRC message is not a measurement report including a Location Information ("LocationInfo") information element ("IE").

Example 88 may include an apparatus to be implemented in a user equipment ("UE"), the apparatus comprising: means for decoding a first message and a third message, wherein the first message comprises an instruction to generate and transmit a report, and a trigger to initiate transmission of the report, wherein the report is to include geo-information of the UE, wherein the third message comprises a schedule for transmission of one or more vehicle-to-vehicle ("V2V") sidelink transmissions, and wherein the schedule is based on the geo-information in the report; means for obtaining the geo-information of the UE according to the instruction; means for generating the report including the geo-information; means for detecting the trigger; means for generating a second message to include the report; means for determining, based on the geo-information, one or more radio frequency ("RF") resources on which to transmit the one or more V2V transmissions based on the schedule; means for encoding the second message for transmission; and means for transmitting the second message in response to detection of the trigger.

Example 89 may include the apparatus of example 88 and/or some other examples herein, further comprising: means for transmitting or receiving one or more V2V communications on the determined one or more RF resources in a transmission interval.

Example 90 may include the apparatus of example 88 and/or some other examples herein, wherein the trigger indicates to transmit the report according to a reporting period or when a predefined event occurs.

Example 91 may include the apparatus of example 90 and/or some other examples herein, wherein the reporting period indicates a minimum reporting periodicity or a maximum reporting periodicity, and the predefined event is one or more of a change in position, a change in travel direction, or a change in velocity.

Example 92 may include the apparatus of example 91 and/or some other examples herein, wherein, when the trigger indicates to transmit the report when the predefined event occurs, the change in velocity is to indicate that the UE is to reduce a frequency at which reports are generated and transmitted as a velocity of the UE is reduced and the UE is to increase the frequency at which reports are generated and transmitted as the velocity of the UE is increased.

Example 93 may include the apparatus of example 91 or 92 and/or some other examples herein, wherein, when the trigger indicates to transmit the report when the predefined event occurs, the change in position is to indicate that transmission of the report is to be triggered when the UE has travelled a specified distance from a position at which a previous report was previously transmitted.

Example 94 may include the apparatus of example 88 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 95 may include the apparatus of example 94 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 96 may include the apparatus of example 94 or 95 and/or some other examples herein, wherein, when the report type indicates an absolute coordinate system, the apparatus comprises: means for obtaining the geo-information as World Geodetic System 84 ("WGS-84") coordinates, and generate the report in a Global Positioning System ("GPS") message format; or means for obtaining the geo-information as Long Term Evolution Positioning Protocol ("LPP") coordinates, and generate the report in an LPP format.

Example 97 may include the apparatus of example 94 or 95 and/or some other examples herein, wherein the geo-information is based on a geographical sub-area ("GSA") of a plurality of GSAs in which the UE is located, and wherein each GSA of the plurality of GSAs are associated with a GSA identifier ("GSAID") and wherein, when the report type indicates a relative coordinate system, and the apparatus further comprising: means for obtaining the geo-information as a coordinate of the UE that is relative to a predetermined reference point; or means for obtaining the geo-information through identification of a GSAID in which the UE is located.

Example 98 may include the apparatus of example 88, 96, or 97 and/or some other examples herein, wherein the RF resources are associated with a corresponding one of a plurality of sidelink resource pools ("SRPs") wherein individual SRPs of the plurality of SRPs have a length equal to a sidelink control ("SC") period and include a plurality of subframes, and wherein individual SRPs of the plurality of SRPs are associated with an SRP identifier ("SRPID").

Example 99 may include the apparatus of example 98 and/or some other examples herein, wherein central processing circuitry is to determine one or more RF resources on which to transmit V2V sidelink transmissions based on the schedule and an SRP associated with a current GSA in which the UE is located.

Example 100 may include the apparatus of example 99 and/or some other examples herein, wherein decoding circuitry is to decode a Downlink Control Information ("DCI") format 5 message to obtain sidelink control information ("SCI") and wherein to determine the one or more RF resources on which to transmit V2V sidelink transmissions, and the apparatus further comprising: means for determining a transmission interval based on the SCI, wherein the transmission interval includes one or more SRPs of the plurality of SRPs; and means for selecting the one or more RF resources on which to transmit the V2V sidelink transmissions within the one or more SRPs of the transmission interval.

Example 101 may include the apparatus of example 100 and/or some other examples herein, further comprising: means for monitoring a physical downlink control channel ("PDCCH") for the DCI format 5 message.

Example 102 may include the apparatus of any one of examples 99-101 and/or some other examples herein, wherein the plurality of subframes of individual SRPs includes a physical sidelink control channel ("PSCCH") subframe and a set of physical sidelink shared channel ("PSSCH") subframes, and wherein the transmission interval is to begin at one of a PSCCH subframe nearest in time to receipt of the DCI format 5 message, a predefined PSCCH subframe indicated by the DCI format 5 message, or a predefined PSSCH subframe indicated by the DCI format 5 message, and wherein the transmission interval is to span a predefined number of PSSCH subframes or span a predefined period of time.

Example 103 may include the apparatus of example 88 and/or some other examples herein, further comprising: means for receiving the first message and the second message; and means for transmitting the third message.

Example 104 may include the apparatus of example 88 or 103 and/or some other examples herein, wherein the first message is an RRC Connection Reconfiguration message including a measurement configuration ("MeasConfig") IE, wherein the MeasConfig IE includes the instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 105 may include the apparatus of example 104 and/or some other examples herein, wherein when the second message is a MAC CE message, the MAC CE message includes a MAC header, and wherein the apparatus further comprising: means for setting a logical channel ID in the MAC header to a first value to indicate that the report includes geo-information as an absolute coordinate; or means for setting the logical channel ID to a second value to indicate that the report includes geo-information as a relative coordinate.

Example 106 may include the apparatus of example 104 and/or some other examples herein, wherein the RRC message is not a measurement report including a Location Information ("LocationInfo") information element ("IE").

Example 107 may include a computer-implemented method to be performed by a user equipment ("UE"), the method comprising: decoding a first message and a third message, wherein the first message comprises an instruction to generate and transmit a report, and a trigger to initiate transmission of the report, wherein the report is to include geo-information of the UE, wherein the third message comprises a schedule for transmission of one or more vehicle-to-vehicle ("V2V") sidelink transmissions, and wherein the schedule is based on the geo-information in the report; obtaining the geo-information of the UE according to the instruction; generating the report including the geo-information; detecting the trigger; generating a second message to include the report; determining, based on the geo-information, one or more radio frequency ("RF") resources on which to transmit the one or more V2V transmissions based on the schedule; encoding the second message for transmission; and transmitting the second message in response to detection of the trigger.

Example 108 may include the method of example 107 and/or some other examples herein, further comprising: transmitting or receiving one or more V2V communications on the determined one or more RF resources in a transmission interval.

Example 109 may include the method of example 107 and/or some other examples herein, wherein the trigger indicates to transmit the report according to a reporting period or when a predefined event occurs.

Example 110 may include the method of example 109 and/or some other examples herein, wherein the reporting period indicates a minimum reporting periodicity or a maximum reporting periodicity, and the predefined event is one or more of a change in position, a change in travel direction, or a change in velocity.

Example 111 may include the method of example 110 and/or some other examples herein, wherein, when the trigger indicates to transmit the report when the predefined event occurs, the change in velocity is to indicate that the UE is to reduce a frequency at which reports are generated and transmitted as a velocity of the UE is reduced and the UE is to increase the frequency at which reports are generated and transmitted as the velocity of the UE is increased.

Example 112 may include the method of example 110 or 111 and/or some other examples herein, wherein, when the trigger indicates to transmit the report when the predefined event occurs, the change in position is to indicate that transmission of the report is to be triggered when the UE has travelled a specified distance from a position at which a previous report was previously transmitted.

Example 113 may include the method of example 107 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 114 may include the method of example 113 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 115 may include the method of example 113 or 114 and/or some other examples herein, wherein, when the report type indicates an absolute coordinate system, the method comprises: obtaining the geo-information as World Geodetic System 84 ("WGS-84") coordinates, and generate the report in a Global Positioning System ("GPS") message format; or obtaining the geo-information as Long Term Evolution Positioning Protocol ("LPP") coordinates, and generate the report in an LPP format.

Example 116 may include the method of example 113 or 114 and/or some other examples herein, wherein the geo-information is based on a geographical sub-area ("GSA") of a plurality of GSAs in which the UE is located, and wherein each GSA of the plurality of GSAs are associated with a GSA identifier ("GSAID") and wherein, when the report type indicates a relative coordinate system, and the method further comprising: obtaining the geo-information as a coordinate of the UE that is relative to a predetermined reference point; or obtaining the geo-information through identification of a GSAID in which the UE is located.

Example 117 may include the method of example 107, 115, or 116 and/or some other examples herein, wherein the RF resources are associated with a corresponding one of a plurality of sidelink resource pools ("SRPs") wherein individual SRPs of the plurality of SRPs have a length equal to a sidelink control ("SC") period and include a plurality of subframes, and wherein individual SRPs of the plurality of SRPs are associated with an SRP identifier ("SRPID").

Example 118 may include the method of example 117 and/or some other examples herein, wherein central processing circuitry is to determine one or more RF resources on which to transmit V2V sidelink transmissions based on the schedule and an SRP associated with a current GSA in which the UE is located.

Example 119 may include the method of example 118 and/or some other examples herein, wherein decoding circuitry is to decode a Downlink Control Information ("DCI") format 5 message to obtain sidelink control information ("SCI") and wherein to determine the one or more RF resources on which to transmit V2V sidelink transmissions, and the method further comprising: determining a transmission interval based on the SCI, wherein the transmission interval includes one or more SRPs of the plurality of SRPs; and selecting the one or more RF resources on which to transmit the V2V sidelink transmissions within the one or more SRPs of the transmission interval.

Example 120 may include the method of example 119 and/or some other examples herein, further comprising:

monitoring a physical downlink control channel ("PDCCH") for the DCI format 5 message.

Example 121 may include the method of any one of examples 118-120 and/or some other examples herein, wherein the plurality of subframes of individual SRPs includes a physical sidelink control channel ("PSCCH") subframe and a set of physical sidelink shared channel ("PSSCH") subframes, and wherein the transmission interval is to begin at one of a PSCCH subframe nearest in time to receipt of the DCI format 5 message, a predefined PSCCH subframe indicated by the DCI format 5 message, or a predefined PSSCH subframe indicated by the DCI format 5 message, and wherein the transmission interval is to span a predefined number of PSSCH subframes or span a predefined period of time.

Example 122 may include the method of example 107 and/or some other examples herein, further comprising: receiving the first message and the second message; and transmitting the third message.

Example 123 may include the method of example 107 or 122 and/or some other examples herein, wherein the first message is an RRC Connection Reconfiguration message including a measurement configuration ("MeasConfig") IE, wherein the MeasConfig IE includes the instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 124 may include the method of example 123 and/or some other examples herein, wherein when the second message is a MAC CE message, the MAC CE message includes a MAC header, and wherein the method further comprising: setting a logical channel ID in the MAC header to a first value to indicate that the report includes geo-information as an absolute coordinate; or setting the logical channel ID to a second value to indicate that the report includes geo-information as a relative coordinate.

Example 125 may include the method of example 123 and/or some other examples herein, wherein the RRC message is not a measurement report including a Location Information ("LocationInfo") information element ("IE").

Example 125A may include one or more computer-readable media including program code, which when executed by one or more processors of a UE, causes the UE to perform the method of examples 107-125 and/or some other examples herein.

Example 126 may include one or more computer-readable media including program code, which when executed by one or more processors, causes a user equipment ("UE") to: receive a first message, wherein the first message comprises an instruction to generate and transmit a report, and a trigger to initiate transmission of the report, wherein the report is to include geo-information of the UE; detect the trigger; obtain the geo-information of the UE according to the instruction and in response to detection of the trigger; generate the report including the geo-information; transmit a second message including the report; receive a third message based on the report, wherein the third message includes scheduling information for vehicle-to-vehicle ("V2V") sidelink communications; determine a transmission interval in which to transmit one or more V2V sidelink communications based on the scheduling information; and determine, based on the geo-information, one or more radio frequency ("RF") resources in the transmission interval on which to transmit the one or more V2V sidelink communications. The one or more computer-readable media may be non-transitory one or more computer-readable media.

Example 127 may include the one or more computer-readable media of example 126 and/or some other examples herein, wherein the UE, in response to execution of the program code, is to: transmit or receive one or more V2V communications on the determined one or more RF resources in the transmission interval.

Example 128 may include the one or more computer-readable media of example 126 and/or some other examples herein, wherein the trigger indicates to transmit the report according to a reporting period or when a predefined event occurs.

Example 129 may include the one or more computer-readable media of example 128 and/or some other examples herein, wherein the reporting period indicates a minimum reporting periodicity or a maximum reporting periodicity, and the predefined event is one or more of a change in position, a change in travel direction, or a change in velocity.

Example 130 may include the one or more computer-readable media of example 129 and/or some other examples herein, wherein, when the trigger indicates to transmit the report when the predefined event occurs, the change in velocity is to indicate that the UE is to reduce a frequency at which reports are generated and transmitted as a velocity of the UE is reduced and the UE is to increase the frequency at which reports are generated and transmitted as the velocity of the UE is increased.

Example 131 may include the one or more computer-readable media of example 129 or 130 and/or some other examples herein, wherein, when the trigger indicates to transmit the report when the predefined event occurs, the change in position is to indicate that transmission of the report is to be triggered when the UE has travelled a specified distance from a position at which a previous report was previously transmitted.

Example 132 may include the one or more computer-readable media of example 126 and/or some other examples herein, wherein the first message further comprises a report type and report timing information, wherein the report timing information indicates when a timestamp is to be recorded with respect to acquisition of the geo-information and the report type indicates a coordinate system to be used for acquisition of the geo-information and a format to be used for the report, wherein the coordinate system is an absolute coordinate system or a relative coordinate system.

Example 133 may include the one or more computer-readable media of example 132 and/or some other examples herein, wherein the report timing information indicates a subframe window size in which the timestamp is to be recorded, a period of time after acquisition of the geo-information in which the timestamp is to be recorded, or to use a time at which the report is to be transmitted as the timestamp.

Example 134 may include the one or more computer-readable media of example 132 or 133 and/or some other examples herein, wherein, when the report type indicates an absolute coordinate system, wherein, the UE, in response to execution of the program code is to: obtaining the geo-information as World Geodetic System 84 ("WGS-84") coordinates, and generate the report in a Global Positioning System ("GPS") message format; or obtaining the geo-information as Long Term Evolution Positioning Protocol ("LPP") coordinates, and generate the report in an LPP format.

Example 135 may include the one or more computer-readable media of example 132 or 133 and/or some other examples herein, wherein the geo-information is based on a geographical sub-area ("GSA") of a plurality of GSAs in which the UE is located, and wherein each GSA of the plurality of GSAs are associated with a GSA identifier ("GSAID") and wherein, when the report type indicates a relative coordinate system, and wherein the UE, in response to execution of the program code, is to: obtain the geo-information as a coordinate of the UE that is relative to a predetermined reference point; or obtain the geo-information through identification of a GSAID in which the UE is located.

Example 136 may include the one or more computer-readable media of example 126, 134, 135 and/or some other examples herein, wherein the RF resources are associated with a corresponding one of a plurality of sidelink resource pools ("SRPs") wherein individual SRPs of the plurality of SRPs have a length equal to a sidelink control ("SC") period and include a plurality of subframes, and wherein individual SRPs of the plurality of SRPs are associated with an SRP identifier ("SRPID").

Example 137 may include the one or more computer-readable media of example 136 and/or some other examples herein, wherein the central processing circuitry is to determine one or more RF resources on which to transmit V2V sidelink transmissions based on the schedule and an SRP associated with a current GSA in which the UE is located.

Example 138 may include the one or more computer-readable media of example 137 and/or some other examples herein, wherein decoding circuitry is to decode a Downlink Control Information ("DCI") format 5 message to obtain sidelink control information ("SCI") and wherein to determine the one or more RF resources on which to transmit V2V sidelink transmissions, and wherein the UE, in response to execution of the program code, is to: determine a transmission interval based on the SCI, wherein the transmission interval includes one or more SRPs of the plurality of SRPs; and select the one or more RF resources on which to transmit the V2V sidelink transmissions within the one or more SRPs of the transmission interval.

Example 139 may include the one or more computer-readable media of example 138 and/or some other examples herein, wherein the UE, in response to execution of the program code, is to: monitor a physical downlink control channel ("PDCCH") for the DCI format 5 message.

Example 140 may include the one or more computer-readable media of any one of examples 137-139 and/or some other examples herein, wherein the plurality of subframes of individual SRPs includes a physical sidelink control channel ("PSCCH") subframe and a set of physical sidelink shared channel ("PSSCH") subframes, and wherein the transmission interval is to begin at one of a PSCCH subframe nearest in time to receipt of the DCI format 5 message, a predefined PSCCH subframe indicated by the DCI format 5 message, or a predefined PSSCH subframe indicated by the DCI format 5 message, and wherein the transmission interval is to span a predefined number of PSSCH subframes or span a predefined period of time.

Example 141 may include the one or more computer-readable media of example 126 and/or some other examples herein, wherein the UE, in response to execution of the program code, is to: receive the first message and the second message; and transmit the third message.

Example 142 may include the one or more computer-readable media of example 126 or 141 and/or some other examples herein, wherein the first message is an RRC Connection Reconfiguration message including a measurement configuration ("MeasConfig") IE, wherein the MeasConfig IE includes the instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

Example 143 may include the one or more computer-readable media of example 142 and/or some other examples herein, wherein when the second message is a MAC CE message, the MAC CE message includes a MAC header, and wherein the media further comprising: set a logical channel ID in the MAC header to a first value to indicate that the report includes geo-information as an absolute coordinate; or set the logical channel ID to a second value to indicate that the report includes geo-information as a relative coordinate.

Example 144 may include the one or more computer-readable media of example 142 and/or some other examples herein, wherein the RRC message is not a measurement report including a Location Information ("LocationInfo") information element ("IE").

The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

The invention claimed is:

1. One or more non-transitory computer-readable media including program code, which when executed by one or more processors, causes an Evolved Node B ("eNB") to:
   generate and encode a first message, wherein the first message includes an instruction to instruct a user equipment ("UE") to generate and transmit a report and the first message is to indicate a trigger to initiate transmission of the report;
   obtain and decode a second message to obtain the report, wherein the report is to include geo-information associated with the UE;
   generate, according to a semi-persistent scheduling algorithm, a schedule of one or more vehicle-to-vehicle ("V2V") sidelink transmissions for the UE, wherein the schedule is based on radio frequency ("RF") resources allocated to a geographical sub-area ("GSA") associated with the geo-information from the obtained report, and wherein the schedule includes a transmission interval comprising one or more sidelink resource pools ("SRPs") of a plurality of SRPs;
   generate and encode a third message, wherein the third message is to indicate the allocation of the RF resources and a window to monitor for Downlink Control Information ("DCI") format 5 transmissions;
   generate and encode a DCI format 5 message to be transmitted to the UE, wherein the DCI format 5 message is to indicate the transmission interval;
   generate and encode a fourth message that includes: a sidelink overload indicator ("SLOI") to indicate a level of interference experienced by the eNB on one or more physical resource blocks of a plurality of subframes or a sidelink high interference indicator ("SLHII") to indicate an occurrence of high interference sensitivity experienced by the eNB on the one or more physical resource blocks of the plurality of subframes;

control transmission of the first message, the third message, the fourth message, and the DCI format 5 message;

obtain and decode a fifth message to obtain a value of another SLHII, a value of another SLOI, and a SRP identifier ("SRPID") or a GSA identifier ("GSAID") associated with the other SLHII and the other SLOI; and update the schedule of the one or more V2V sidelink transmissions based on the value of the other SLHII, and the value of the other SLOI.

2. The one or more non-transitory computer-readable media of claim 1, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

3. The one or more non-transitory computer-readable media of claim 1, wherein the fourth message further includes SRPID or a GSAID associated with the SLHII or the SLOI.

4. The one or more non-transitory computer-readable media of claim 1, wherein the fourth message and the fifth message are X2 application protocol ("X2AP") messages, and wherein the fifth message is one of a Load Information message or a sidelink load indicator message.

5. The one or more non-transitory computer-readable media of claim 1, wherein, the first message is an radio resource control ("RRC") Connection Reconfiguration message including a measurement configuration ("MeasConfig") information element (IE), wherein the MeasConfig IE includes the instruction and the trigger, and the second message is a Medium Access control ("MAC") control element ("CE") message to be signaled using layer 2 ("L2") signaling, or the second message is a RRC message to be signaled using layer 3 ("L3") signaling.

6. One or more non-transitory computer-readable media including program code, which when executed by one or more processors, causes an Evolved Node B ("eNB") to:

generate and encode a first message, wherein the first message includes an instruction to instruct a user equipment ("UE") to generate and transmit a report and the first message is to indicate a trigger to initiate transmission of the report;

obtain and decode a second message to obtain the report, wherein the report is to include geo-information associated with the UE;

generate, according to a semi-persistent scheduling algorithm, a schedule of one or more vehicle-to-vehicle ("V2V") sidelink transmissions for the UE, wherein the schedule is based on radio frequency ("RF") resources allocated to a geographical sub-area ("GSA") associated with the geo-information from the obtained report, and wherein the schedule includes a transmission interval comprising one or more sidelink resource pools ("SRPs") of a plurality of SRPs;

generate and encode a third message, wherein the third message is to indicate the allocation of the RF resources and a window to monitor for Downlink Control Information ("DCI") format 5 transmissions;

generate and encode a DCI format 5 message to be transmitted to the UE, wherein the DCI format 5 message is to indicate the transmission interval;

generate and encode a fourth message that includes: a sidelink overload indicator ("SLOI") to indicate a level of interference experienced by the eNB on one or more physical resource blocks of a plurality of subframes or a sidelink high interference indicator ("SLHII") to indicate an occurrence of high interference sensitivity experienced by the eNB on the one or more physical resource blocks of the plurality of subframes, wherein the fourth message further includes an SRP identifier ("SRPID") or a GSA identifier ("GSAID") associated with the SLHII or the SLOI; and control transmission of the first message, the third message, the fourth message, and the DCI format 5 message.

7. The one or more non-transitory computer-readable media of claim 6, wherein individual SRPs of the plurality of SRPs include a plurality of subframes, wherein the plurality of subframes includes a physical sidelink control channel ("PSCCH") subframe and a set of physical sidelink shared channel ("PSSCH") subframes, and wherein the transmission interval is to begin at a PSCCH subframe nearest in time to transmission of the DCI format 5 message, or begin at a predefined PSCCH subframe indicated by the DCI format 5 message, and wherein the transmission interval is to span a predefined number of PSSCH subframes, or span a predefined period of time.

8. The one or more non-transitory computer-readable media of claim 6, wherein, the first message is an RRC Connection Reconfiguration message including a measurement configuration ("MeasConfig") IE, wherein the MeasConfig 1E includes the instruction and the trigger, and the second message is a Medium Access control ("MAC") control element ("CE") message to be signaled using layer 2 ("L2") signaling, or the second message is a Radio Resource Control ("RRC") message to be signaled using layer 3 ("L3") signaling.

* * * * *

UNITED STATES PATENT AND TRADEMARK OFFICE
CERTIFICATE OF CORRECTION

PATENT NO. : 10,820,336 B2
APPLICATION NO. : 16/080554
DATED : October 27, 2020
INVENTOR(S) : Alexey Khoryaev et al.

Page 1 of 1

It is certified that error appears in the above-identified patent and that said Letters Patent is hereby corrected as shown below:

In the Claims

Column 48
Line 48, Claim 8: replace 1E after "wherein the MeasConfig" with IE.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*